US008748359B2

(12) United States Patent
Harrison et al.

(10) Patent No.: US 8,748,359 B2
(45) Date of Patent: *Jun. 10, 2014

(54) POST-TREATED ADDITIVE COMPOSITION AND METHOD OF MAKING THE SAME

(71) Applicants: James J. Harrison, Novato, CA (US); Mitra Hosseini, Dublin, CA (US)

(72) Inventors: James J. Harrison, Novato, CA (US); Mitra Hosseini, Dublin, CA (US)

(73) Assignee: Chevron Oronite Company LLC, San Ramon, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/685,904

(22) Filed: Nov. 27, 2012

(65) Prior Publication Data
US 2013/0085235 A1  Apr. 4, 2013

Related U.S. Application Data

(63) Continuation of application No. 12/341,432, filed on Dec. 22, 2008.

(51) Int. Cl.
C10M 149/12 (2006.01)

(52) U.S. Cl.
USPC ........... 508/291; 508/582; 508/293; 548/546; 549/233

(58) Field of Classification Search
USPC .................. 508/287, 293, 291, 582; 548/546; 549/233
See application file for complete search history.

(56) References Cited

U.S. PATENT DOCUMENTS

| | | | |
|---|---|---|---|
| 2,551,813 A | 5/1951 | Pinkney | |
| 2,992,708 A | 7/1961 | Lyon | |
| 3,018,291 A | 1/1962 | Anderson et al. | |
| 3,024,237 A | 3/1962 | Drummond et al. | |
| 3,100,673 A | 8/1963 | Ulmer et al. | |
| 3,172,892 A | 3/1965 | Le Suer et al. | |
| 3,215,707 A | 11/1965 | Rense | |
| 3,219,666 A | 11/1965 | Norman et al. | |
| 3,231,587 A | 1/1966 | Rense | |
| 3,272,746 A | 9/1966 | Le Suer et al. | |
| 3,515,669 A | 6/1970 | Le Suer | |
| 3,579,450 A | 5/1971 | Lesuer | |
| 3,804,763 A | 4/1974 | Meinhardt | |
| 3,912,764 A | 10/1975 | Palmer, Jr. | |
| 4,152,499 A | 5/1979 | Boerzel et al. | |
| 4,384,115 A | 5/1983 | Renga | |
| 4,423,205 A | 12/1983 | Rajan | |
| 4,605,808 A | 8/1986 | Samson | |
| 4,670,173 A | 6/1987 | Hayashi et al. | |
| 4,952,328 A | 8/1990 | Davis et al. | |
| 5,071,919 A | 12/1991 | DeGonia et al. | |
| 5,112,507 A | 5/1992 | Harrison | |
| 5,137,980 A | 8/1992 | DeGonia et al. | |
| 5,175,225 A | 12/1992 | Ruhe, Jr. | |
| 5,254,649 A | 10/1993 | Miln et al. | |
| 5,266,186 A | 11/1993 | Kaplan | |
| 5,286,823 A | 2/1994 | Rath | |
| 5,356,552 A | 10/1994 | Harrison et al. | |
| 5,362,411 A | 11/1994 | Bergstra et al. | |
| 5,565,528 A | 10/1996 | Harrison et al. | |
| 5,616,668 A | 4/1997 | Harrison et al. | |
| 5,674,819 A | 10/1997 | Sivik et al. | |
| 5,716,912 A | 2/1998 | Harrison et al. | |
| 5,753,597 A | 5/1998 | Harrison et al. | |
| 5,792,729 A | 8/1998 | Harrison et al. | |
| 5,872,083 A | 2/1999 | Harrison et al. | |
| 6,015,776 A | 1/2000 | Harrison et al. | |
| 6,146,431 A | 11/2000 | Harrison et al. | |
| 6,358,892 B1 | 3/2002 | Harrison et al. | |
| 6,451,920 B1 | 9/2002 | Harrison et al. | |
| 6,617,396 B1 | 9/2003 | Harrison et al. | |
| 6,867,171 B2 | 3/2005 | Harrison et al. | |
| 6,906,011 B2 | 6/2005 | Harrison et al. | |
| 7,091,306 B2 | 8/2006 | Heddadj et al. | |
| 7,411,108 B2 | 8/2008 | Elomari et al. | |
| 2003/0216266 A1 | 11/2003 | Hirano et al. | |
| 2005/0202980 A1 | 9/2005 | Loper et al. | |
| 2006/0025316 A1 | 2/2006 | Covitch et al. | |
| 2006/0247386 A1 | 11/2006 | Ruhe, Jr. et al. | |
| 2007/0027267 A1 | 2/2007 | Ruhe, Jr. et al. | |
| 2007/0049503 A1 | 3/2007 | Stokes et al. | |
| 2007/0293409 A1 | 12/2007 | Kolp et al. | |

FOREIGN PATENT DOCUMENTS

| | | |
|---|---|---|
| DE | 4313088 A | 10/1994 |
| EP | 0169715 | 1/1986 |
| EP | 0355895 A | 2/1990 |
| EP | 0565285 A | 10/1993 |
| EP | 0446211 | 3/1995 |
| EP | 0387346 | 6/1995 |
| EP | 0733697 | 9/1996 |
| EP | 1086960 | 3/2001 |
| JP | 4113032 | 7/1966 |
| JP | 51130409 | 11/1976 |
| JP | 04296309 | 10/1992 |
| JP | 05178924 | 7/1993 |
| JP | 2001247624 | 9/2001 |
| JP | 2005330303 | 12/2005 |
| KR | 102000016494 | 3/2000 |
| WO | 9003359 A1 | 4/1990 |
| WO | WO 9003359 A1 * | 4/1990 |
| WO | 9310063 A1 | 5/1993 |
| WO | 9324539 A1 | 12/1993 |
| WO | 2009132250 | 10/2009 |

* cited by examiner

Primary Examiner — Jim Goloboy

(57) ABSTRACT

An oil-soluble lubricating oil additive composition prepared by the process which comprises reacting (A) reacting a copolymer of an (i) an unsaturated acidic reagent; and (ii) a mono-olefin, with at least one linking hydrocarbyl di-primary amine, thereby producing a hybrid succinic anhydride copolymer having from about 10% to about 90% unreacted anhydride groups; and subsequently (B) reacting the hybrid succinic anhydride copolymer with a second amine compound, thereby producing the succinimide; and (C) reacting the succinimide with at least one post-treating agent selected from a cyclic carbonate, a linear mono-carbonate, a linear poly-carbonate, an aromatic polycarboxylic acid, an aromatic polycarboxylic anhydride, an aromatic polycarboxylic acid ester, or mixtures thereof.

9 Claims, No Drawings

POST-TREATED ADDITIVE COMPOSITION AND METHOD OF MAKING THE SAME

PRIORITY

This application is a continuation of co-pending U.S. patent application Ser. No. 12/341,432, filed Dec. 22, 2008, the contents of which are incorporated herein by reference.

FIELD OF THE INVENTION

The present invention is directed to an improved dispersant additive composition that is used in engine oils or fuels; and it is also directed to the process of making the same.

BACKGROUND OF THE INVENTION

It is known to employ nitrogen containing dispersants and/or detergents in the formulation of lubricating oil compositions. Many of the known dispersant/detergent compounds are based on the reaction of an alkenylsuccinic acid or anhydride with an amine or polyamine to produce an alkenylsuccinimide or an alkenyl succinamic acid as determined by selected conditions of reaction. One problem facing the lubricant manufacturer is finding a single dispersant product that has good dispersant properties, low viscosity, as well as shear stability in internal combustion engines. Failure to have adequate shear stability may result in wear in an internal combustion engine.

Lubricating oil compositions for internal combustion engines generally contain a variety of additives to reduce or control deposits, wear, corrosion, etc. Similarly, liquid hydrocarbon fuels for internal composition engines, at a minimum, contain additives which control or reduce the formation of deposits. The present invention is concerned with compositions useful as dispersants or deposit inhibitors.

In lubricating oils, dispersants function to control sludge, carbon, and varnish produced primarily by the incomplete oxidation of the fuel, or impurities in the fuel, or impurities in the base oil used in the lubricating oil composition. Deposit inhibitors in fuel control or reduce engine deposits also caused by incomplete combustion of the fuel. Such deposits can form on the carburetor parts, throttle bodies, fuel injectors, intake ports, and valves. Those deposits can present significant problems, including poor acceleration and stalling, and increased fuel consumption and exhaust pollutants.

One of the most effective classes of lubricating oil dispersants and fuel deposit inhibitors is polyalkylene succinimides. In some cases, the succinimides have also been found to provide fluid-modifying properties, or a so-called viscosity index credit, in lubricating oil compositions. This results in a reduction in the amount of viscosity index improver, which would be otherwise required.

DESCRIPTION OF THE RELATED ART

Ruhe, Jr. et al, U.S. Published Patent Application US20060247386 discloses an oil-soluble lubricating oil additive composition prepared by the process which comprises reacting a copolymer, with at least one ether compound and at least one aromatic amine.

Ruhe, Jr. et al., U.S. Published Patent Application US20070027267 discloses an oil-soluble lubricating oil additive composition prepared by the process which comprises reacting a copolymer, with at least one ether compound and at least one aromatic amine.

Scattergood, European Published Patent Application EP0733697 discloses a process for preparing ashless dispersants.

Harrison, U.S. Pat. No. 5,112,507 discloses copolymers of unsaturated acidic reagents and high molecular weight olefins wherein at least 20 percent of the total high molecular weight olefin comprises the alkylvinylidene isomer.

Harrison, European Published Patent Application EP0387346 discloses high molecular weight dispersants.

Hayashi et al., U.S. Pat. No. 4,670,173 discloses dispersants tha tare formed by the reaction product of an acylating product, a polyamine and a mono-functional acid.

Ruhe, Jr., European Published Patent Application EP0446211 discloses a process for preparing polymeric dispersants having alternateing polyalkylene and succinic groups.

Harrison et al., U.S. Pat. No. 5,792,729 discloses a terpolymer hving an average Mn of from 600 to 100,000 that is obtained by the terpolymerization of a 1-olefin having from 10 to 30 carbon atoms, maleic anhydride, and a 1-1-disubstituted polyisobutylene having an average Mn of from 500 to 5,000.

Harrison et al., U.S. Pat. No. 6,015,776 a polysuccinimide composition that is prepared by reacting a mixture of an alkenyl or akylsuccinic acid derivative, an unsaturated acidic reagent copolymer, and a polyamine under reactive conditions.

Harrison et al., U.S. Pat. No. 5,716,912 discloses a succinimide composition that is prepared by reacting a mixture of an alkenyl or alkylsuccinic acid derivative, an unsaturated acidic reagent copolymer and a polyamine under reactive conditions; then treating the reaction product with either a cyclic carbonate or a linear mono- or polycarbonate or boron compound under reactive conditions.

Harrison et al., U.S. Pat. No. 5,753,597 discloses a polysuccinimide composition that is prepared by reacting a mixture of a copolymer of a first unsaturated acidic reagent and a 1,1-disubstituted olefin; a copolymer of a second unsaturated acidic reagent and a 1-olefin, and a polyamine under reactive conditions then treating the reaction product with either a cyclic carbonate or a linear mono- or polycarbonate or boron compound under reactive conditions.

Harrison et al., U.S. Pat. No. 6,358,892 discloses a succinimide composition that is prepared by reacting a mixture of an alkenyl or alkylsuccinic acid derivative, an unsaturated acidic reagent copolymer, and a polyamine under reactive conditions; then treating the reaction product with either a cyclic carbonate or a linear mono- or polycarbonate or boron compound under reactive conditions.

Harrison et al., U.S. Pat. No. 6,451,920 discloses a process for preparing a mixture of (1) a copolymer of a polyalkene and an unsaturated acidic reagent and (2) a polyalkenyl derivative of an unsaturated acidic reagent.

Harrison et al., U.S. Pat. No. 6,617,396 discloses a process for preparing a mixture of (1) a copolymer of a polyalkene and an unsaturated acidic reagent and (2) a polyalkenyl derivative of an unsaturated acidic reagent.

Kaplan, U.S. Pat. No. 5,266,186 discloses dispersants which comprise polyimides which are prepared by reacting fatty amines with maleic anhydride/alpha-olefin copolymers.

SUMMARY OF THE INVENTION

It has now been discovered that the reaction product of copolymers and specific amine linking agents (i.e., diamine linking agents), results in a "hybrid succinic anhydride copolymer" product. This hybrid succinic anhydride copolymer may be reacted further with other amines or polyamines or mixtures thereof to form succinimide products that have good dispersant qualities, low viscosity, and shear stability. The succinimide may be reacted further with a post-treating agent.

In one embodiment, the present invention is directed to a post-treated succinimide additive composition prepared by a process which comprises
(A) reacting a copolymer of an (i) an unsaturated acidic reagent; and (ii) a mono-olefin, with at least one linking hydrocarbyl di-primary amine, thereby producing a hybrid succinic anhydride copolymer having from about 10% to about 90% unreacted anhydride groups; and subsequently
(B) reacting the hybrid succinic anhydride copolymer with a second amine compound, thereby producing a succinimide; and
(C) reacting the succinimide with at least one post-treating agent selected from a cyclic carbonate, a linear mono-carbonate, a linear poly-carbonate, an aromatic polycarboxylic acid, an aromatic polycarboxylic anhydride, an aromatic polycarboxylic acid ester, or mixtures thereof, thereby producing a post-treated succinimide additive composition.

In one embodiment, the present invention is directed to a lubricating oil composition comprising a major amount of an oil of lubricating viscosity and a minor amount of a post-treated succinimide additive composition prepared by the process which comprises (A) reacting a copolymer of an (i) an unsaturated acidic reagent; and (ii) a mono-olefin, with at least one linking hydrocarbyl di-primary amine, thereby producing a hybrid succinic anhydride copolymer having from about 10% to about 90% unreacted anhydride groups; and subsequently (B) reacting the hybrid succinic anhydride copolymer with a second amine compound, thereby producing a succinimide; and (C) reacting the succinimide with at least one post-treating agent selected from a cyclic carbonate, a linear mono-carbonate, a linear poly-carbonate, an aromatic polycarboxylic acid, an aromatic polycarboxylic anhydride, an aromatic polycarboxylic acid ester, or mixtures thereof, thereby producing a post-treated succinimide additive composition.

In one embodiment, the present invention is directed to a method of making a post-treated succinimide additive composition comprises
(A) reacting a copolymer of an (i) an unsaturated acidic reagent; and (ii) a mono-olefin, with at least one linking hydrocarbyl di-primary amine, thereby producing a hybrid succinic anhydride copolymer having from about 10% to about 90% unreacted anhydride groups; and subsequently
(B) reacting the hybrid succinic anhydride copolymer with a second amine compound, thereby producing a succinimide; and
(C) reacting the succinimide with at least one post-treating agent selected from a cyclic carbonate, a linear mono-carbonate, a linear poly-carbonate, an aromatic polycarboxylic acid, an aromatic polycarboxylic anhydride, an aromatic polycarboxylic acid ester, or mixtures thereof, thereby producing a post-treated succinimide additive composition.

Accordingly, the present invention relates to multi-functional lubricating oil and fuel additives which are useful as dispersants.

DETAILED DESCRIPTION OF THE INVENTION

While the invention is susceptible to various modifications and alternative forms, specific embodiments thereof are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

Definitions

The following terms used with the description are defined as such:

The term "PIB" is an abbreviation for polyisobutene.

The term "PIBSA" is an abbreviation for polyisobutenyl succinic anhydride.

The term "copolymer" refers to a class of copolymers employed within the scope of the present invention which are copolymers of an olefin and an unsaturated acidic reagent, and more specifically, a monoethylenically unsaturated $C_3$-$C_{28}$ monocarboxylic acid or ester thereof, or a $C_4$-$C_{28}$ dicarboxylic acid, anhydride or ester thereof which have carboxyl groups, preferably succinic groups, and polyalkyll groups. The preferred copolymer is a copolymer of polyisobutene and maleic anhydride (herein referred to as "polyPIBSA") having the general formula:

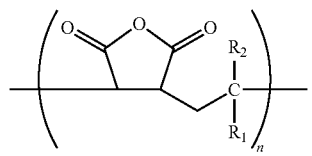

wherein n is one or greater; wherein one of $R_1$ and $R_2$ is methyl and the other is a polyisobutyl residue having at least about 5 carbon atoms, preferably at least about 29 carbon atoms. The polyPIBSA copolymer may be alternating, block, or random.

The term "succinic group" refers to a group having the formula:

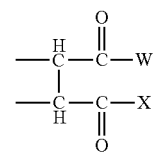

wherein W and X are independently selected from the group consisting of —OH, —Cl, —O— lower alkyl or taken together are —O— to form a succinic anhydride group. The term "—O— lower alkyl" is meant to include alkoxy of 1 to 6 carbon atoms.

The term "hybrid succinic anhydride copolymer" refers to the reaction product of a copolymer with a linking diamine, wherein the reaction product contains at least from about 10%-90% unreacted anhydride groups, preferably from about 20%-80% unreacted anhydride groups, more preferably from about 40%-80% unreacted anhydride groups, and most preferably from about 50%-75% unreacted anhydride groups, The ratios of linking diamine to anhydride groups ranges preferably from about 0.05:1 to about 0.45:1, preferably from about 0.10:1 to about 0.40:1 more preferably from about 0.15:1 to about 0.30:1, most preferably from about 0.125:1 to about 0.25:1.

The term "degree of polymerization" refers to the average number of repeating structural units in the copolymer chain.

The term "succinimide" is understood in the art to include many of the amide, imide, etc. species which are also formed by the reaction of a succinic anhydride with an amine. The predominant product, however, is succinimide and this term has been generally accepted as meaning the product of a reaction of an alkenyl- or alkyl-substituted succinic acid or anhydride with an amine. Alkenyl or alkyl succinimides are disclosed in numerous references and are well known in the art. Certain fundamental types of succinimides and related materials encompassed by the term of art "succinimide" are taught in U.S. Pat. Nos. 2,992,708; 3,018,291; 3,024,237; 3,100,673; 3,219,666; 3,172,892: and 3,272,746, the disclosures of which are hereby incorporated by reference.

The term "succinimide" refers to the reaction product of a succinic group-containing copolymer with an amine, polyamine, aromatic amine, or mixtures thereof.

The term "alkylvinylidene" "alkylvinylidene isomer" refers to olefins and polyalkylene components having the following vinylindene structure:

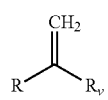

wherein R is an alkyl of at least 4 carbon atoms, preferably at least about 30 carbon atoms, more preferably at least about 50 carbon atoms and $R_{v'}$ is a methyl or ethyl group.

The term "amino" refers to $—NR_1R_2$ wherein $R_1$ and $R_2$ are independently hydrogen or a hydrocarbyl group.

The term "alkyl" refers to both straight- and branched-chain alkyl groups.

The term "polyalkyl" refers to an alkyl group that is generally derived from polyolefins which are polymers or copolymers of mono-olefins, particularly 1-mono-olefins, such as ethylene, propylene, butylene, and the like. Preferably, the mono-olefin employed will have 2 to about 24 carbon atoms, and more preferably, about 3 to 12 carbon atoms. More preferred mono-olefins include propylene, butylene, particularly isobutylene, 1-octene and 1-decene. Preferred, polyolefins prepared from such mono-olefins include polypropylene, polybutene, especially polyisobutene.

The term "hydrocarbyl" means any aliphatic or aromatic hydrocarbon, which contains only hydrogen and carbon atoms.

One embodiment of the present invention is a hybrid succinic anhydride copolymer. The hybrid succinic anhydride copolymer is the reaction product of a copolymer and a linking diamine. Another embodiment of the present invention is a succinimide dispersant that is the reaction product of the hybrid succinic anhydride copolymer and a second amine compound selected from aliphatic or aromatic monoamines or polyamines, or mixtures thereof. Another embodiment of the present invention is a post-treated succinimide dispersant that is the reaction product of the aforementioned succinimide and a post-treating agent.

(A) Hybrid Succinic Anhydride Copolymer

The hybrid succinic anhydride copolymer is a polyanhydride obtained by linking together several copolymers with a linking diamine at the terminal anhydride groups.

The hybrid succinic anhydride copolymers of the present invention are prepared by reacting a copolymer, which has been prepared by reacting an olefin with an unsaturated acidic reagent in the presence of a free radical inhibitor, with a linking diamine. The olefin used to make the copolymer can be any monoolefin, preferably an alpha olefin, more preferably a 1-olefin, more preferably a vinylidene olefin, most preferably a methylvinylidene olefin. Mixtures of olefins may be used. Some examples of 1-olefins are ethylene, propylene, isobutylene, 1-pentene, 1-hexene, 1-heptene, 1-octene, 1-nonene, 1-decene, 1-undecene, 1-dodecene, 1-dodecene, 1-tetradecene, 1-hexadecene, 1-octadecene, isobutylene, 2,4,4-trimethylpentene, styrene, and the like. Suitable olefins may contain a sufficient number of carbon atoms so that the copolymer is soluble in oil and thus have on the order of about 30 carbon atoms or more. Preferred olefins are polyisobutenes and polypropylenes. Especially preferred are polyisobutenes, particularly preferred are those having a molecular weight of about 420 to about 10,000, more preferably about 900 to 5,000, more preferably about 1,500 to about 3,000, most preferably about 2000 to 2,500.

Among other factors, the present invention is based on the surprising discovery that the reaction of a copolymer with a linking diamine, or mixtures of linking diamines, takes place predominantly at the terminal anhydride groups and not at the internal anhydride groups.

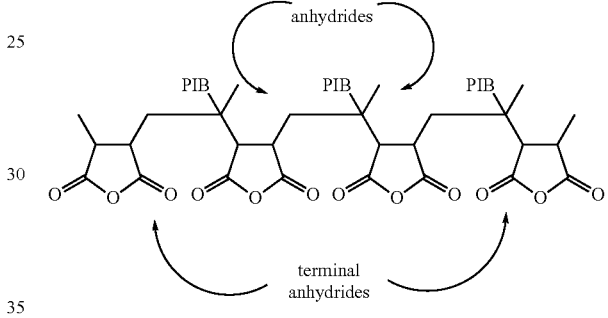

It is believed that the reason for this is due to the fact that the terminal anhydride groups are less sterically hindered than the internal anhydride groups and the terminal anhydride groups react faster than the internal anhydride groups with the linking diamine. If desired, the copolymers are reacted with a sufficient amount of linking diamine to join together one or more copolymer moieties via a succinimide group, but with an insufficient amount of linking diamine such that the hybrid succinic anhydride copolymer contains sufficient unreacted succinic reagent groups. The charge mole ratio of linking diamine to anhydride groups in the copolymer can vary over a wide range, from about 0.05:1 to about 0.45:1, preferably from about 0.10:1 to about 0.40:1 more preferably from about 0.15:1 to about 0.30:1, most preferably from about 0.125:1 to about 0.25:1.

It is believed that the linking diamine joins several copolymers together via a succinimide linkage to produce a high molecular weight linear hybrid succinic anhydride copolymer. The amount of unreacted anhydride groups in the hybrid succinic anhydride copolymer can vary over a wide range from at least from about 10%-90% unreacted anhydride groups, preferably from about 20%-80% unreacted anhydride groups, more preferably from about 40%-80% unreacted anhydride groups, and most preferably from about 50%-75% unreacted anhydride groups.

Since the high molecular weight olefins which may be used to prepare the copolymers of the present invention are generally mixtures of individual molecules of different molecular weights, individual copolymer molecules resulting will generally contain a mixture of high molecular weight polyalkyl groups of varying molecular weight. Also, mixtures of copolymer molecules having different degrees of polymerization will be produced. The copolymers may have an average degree of polymerization (n) of 1 or greater, preferably from about 1.1 to about 20, and more preferably from about 1.5 to about 10.

The copolymers may have a succinic ratio, defined as the number of anhydride groups per alkyl tail, from between 1.0 to about 5.0, preferably from about 1.0 to about 3.0, more preferably from about 1.1 to about 2.0. The succinic ratio may be measured by procedures described in U.S. Pat. No. 5,356,552.

The hybrid succinic anhydride copolymers of the present invention may have the formula:

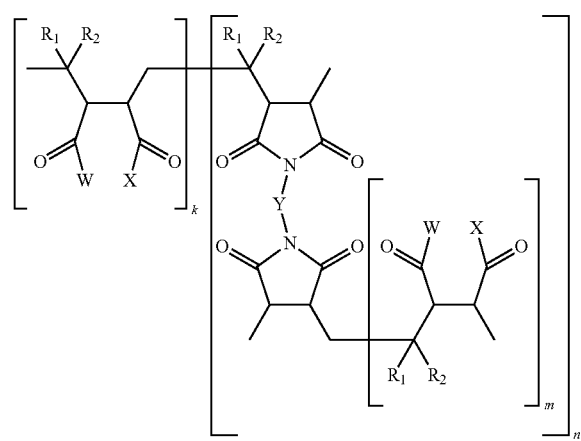

(I)

Wherein one of $R_1$ and $R_2$ is either lower alkyl or hydrogen, and the other of $R_1$ and $R_2$ is polyalkyl, W and X are independently selected from the group consisting of —OH, —O—R' wherein R' is lower alkyl, or taken together are —O— to form a succinic anhydride group, n, m, and k are 1 to 20, and Y is alkylene having from about 2 to 20 carbon atoms.

Formula II depicts the structural composition of the hybrid succinic anhydride copolymer, having polyisobutenyl groups. In particular, the hybrid succinic anhydride copolymer shown in Formula II is derived from the reaction product of maleic anhydride/PIB copolymer and ethylene diamine.

II

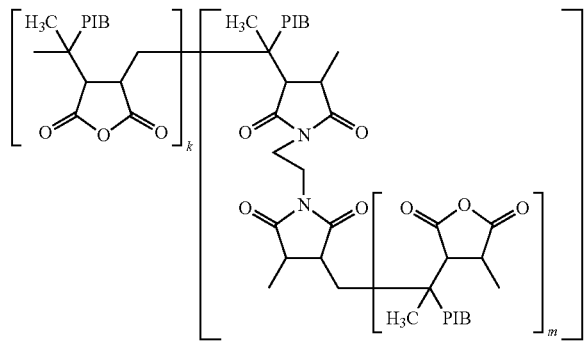

Wherein n, m, and k are 1 to 20.

The Starting Copolymer

The starting copolymer employed in the present invention is obtained by reacting (a) an olefin and (b) an unsaturated acidic reagent, in the presence of a free radical initiator. The unsaturated acidic reagent has at least one monoethylenically unsaturated $C_3$-$C_{28}$ monocarboxylic acid or ester thereof, or a $C_4$-$C_{28}$ dicarboxylic acid, anhydride or ester thereof The Olefin The olefin employed in the present invention is a monoolefin having at least 2 carbon atoms. Suitable mono-olefins include normal alpha olefins, 1-olefins, polyolefins, and mixtures thereof. Examples of suitable monoolefins and methods of deriving the monoolefins may be found in U.S. Pat. No. 7,411,108, which is herein incorporated by reference. Some examples of mono-olefins are ethylene, propylene, isobutylene, 1-pentene, 1-hexene, 1-heptene, 1-octene, 1-nonene, 1-decene, 1-undecene, 1-dodecene, 1-dodecene, 1-tetradecene, 1-hexadecene, 1-octadecene, isobutylene, 2,4,4-trimethylpentene, styrene, and the like.

In one embodiment the olefin is a polyolefin polymer, preferably having an Mn of from 420 to 5000.

Suitable polyolefin polymers for reaction with the unsaturated acidic reagent include polymers comprising a major amount of C2 to C5 monoolefin, e.g., ethylene, propylene, butylene, iso-butylene and pentene. The polymers can be homopolymers, such as polyisobutylene, as well as copolymers of two or more such olefins, such as copolymers of: ethylene and propylene, butylene, and isobutylene etc. Other copolymers include those in which a minor amount of the copolymer monomers (e.g., 1 to 20 mole percent) is a C4 to C8 nonconjugated diolefin, e.g., a copolymer of isobutylene and butadiene or a copolymer of ethylene, propylene and 1,4-hexadiene, etc.

A particularly preferred class of olefin polymers comprises polybutenes, which are prepared by the polymerization of one or more of 1-butene, 2-butene and isobutene. Especially desirable are polybutenes containing a substantial proportion of units derived from isobutene. The polybutene may contain minor amounts of butadiene, which may or may not be incorporated in the polymer. These polybutenes are readily available commercial materials that are well known to those skilled in the art. Disclosures thereof will be found, for example, in U.S. Pat. Nos. 3,215,707; 3,231,587; 3,515,669; 3,579,450; 3,912,764; 4,152,499; 4,605,808; 5,356,552; and 5,872,083 which are herein incorporated by reference for their disclosures of suitable polybutenes.

In one embodiment the olefin polymer is a low molecular weight polyalkenyl substituent. Preferably, the low molecular weight polyalkenyl substituent is low molecular weight polyisobutenyl group or a mixture of low molecular weight polyisobutenyl groups having from about 8 to about 32 carbon atoms, derived from a polyisobutene having at least 50% of the methylvinylidene isomer plus trisubstituted isomer. (For example, see U.S. Pat. No. 6,867,171).

In one embodiment, the olefin polymer is a high molecular weight polyalkyl/polyalkenyl substituent. The high molecular weight polyalkyl group has at least about 30 carbon atoms (preferably at least about 50 carbon atoms). Preferred high molecular weight polyalkyl groups include polyisobutyl groups. Preferred polyisobutyl groups include those having average molecular weights of about 500 to about 5000, more preferably from about 900 to about 2500. Preferred lower alkyl groups include methyl and ethyl; especially preferred lower alkyl groups include methyl. (For example, see U.S. Pat. No. 5,112,507).

The polyalkylene is highly reactive or high methyl vinylidene polyalkylene, most commonly polyisobutene, such as described in U.S. Pat. Nos. 4,152,499; 5,071,919;

5,137,980; 5,286,823; 5,254,649; published International Application Nos. WO 93 24539-A1; WO 9310063-A1; and published European Patent Application Nos. 0355895-A; 0565285A; and 0587381 A, all of which are hereby incorporated by reference in their entirety. (For example, see U.S. Pat. No. 5,872,083 which is herein incorporated by reference).

The high molecular weight olefins used in the preparation of the copolymers of the present invention are of sufficiently long chain length so that the resulting composition is soluble in and compatible with mineral oils, fuels and the like; and the alkylvinylidene isomer of the high molecular weight olefin comprises at least about 20% of the total olefin composition.

Such high molecular weight olefins are generally mixtures of molecules having different molecular weights and can have at least one branch per 6 carbon atoms along the chain, preferably at least one branch per 4 carbon atoms along the chain, and particularly preferred that there be about one branch per 2 carbon atoms along the chain. These branched chain olefins may conveniently comprise polyalkenes prepared by the polymerization of olefins of from 3 to 6 carbon atoms, and preferably from olefins of from 3 to 4 carbon atoms, and more preferably from propylene or isobutylene. The addition-polymerizable olefins employed are normally 1-olefins. The branch may be of from 1 to 4 carbon atoms, more usually of from 1 to 2 carbon atoms and preferably methyl.

The preferred alkylvinylidene isomer comprises a methyl- or ethylvinylidene isomer, more preferably the methylvinylidene isomer.

The especially preferred high molecular weight olefins used to prepare the copolymers of the present invention are polyisobutenes which comprise at least about 20% of the more reactive methylvinylidene isomer, preferably at least 50% and more preferably at least 70%. Suitable polyisobutenes include those prepared using $BF_3$ catalysis. The preparation of such polyisobutenes in which the methylvinylidene isomer comprises a high percentage of the total composition is described in U.S. Pat. Nos. 4,152,499 and 4,605,808. (For example, see U.S. Pat. No. 5,565,528 which is herein incorporated by reference).

Other polyalkenes can also be used including, for example, polyalkenes prepared using metallocene catalysts such as those described in German Patent Application No. DE 4313088A1. (For example, see U.S. Pat. No. 5,872,083 which is herein incorporated by reference).

In one embodiment an olefin polymer or a copolymer of two or more types of olefins is employed as the alkenyl substituent. Specifically, it is employed as a polyalkenyl substituent which contains both alkylvinylidene isomers and non-alkylvinylidene isomers. Preferably, the polyalkene is polybutene, more preferably polyisobutene, and most preferably a polyisobutene wherein at least 50%, but less than 100%, of the polyisobutene has methylvinylidene end groups. Preferably, the polyalkene has a number average molecular weight (Mn) of from about 500 to about 2500.

The polyalkene can also be used in combination with a 1-olefin (also known as "alpha-olefin"). The 1-olefin typically has five or more carbon atoms, preferably about 10 to about 30 carbon atoms. U.S. Pat. No. 5,792,729, issued to Harrison and Ruhe, discloses the preparation of terpolymers made from a polyalkene, a 1-olefin and an unsaturated acidic reagent and is incorporated herein by reference in its entirety.

In one embodiment the process used to prepare the copolymer by reaction of (a) an olefin with an unsaturated acidic reagent with a free radical initiator can also include (b) reacting the product of step (a) with an unsaturated acidic reagent at elevated temperature in the presence of a strong acid. (For example, see U.S. Pat. No. 6,617,396, which is herein incorporated by reference).

In one embodiment, the olefin polymer comprises 1,1-disubstitued olefins and 1-olefins, which are reacted with an unsaturated acidic reagent to obtain a terpolymer. Preferably, the 1-olefins have from about C10 to about C30. Mixtures of olefins, e.g., C14, C16 and C18, may also be employed. Preferably, the 1,1-disubstituted olefin has an average $M_n$ of from 500 to 5000. One particularly useful 1,1-disubstituted olefin is a 1,1-disubstituted polyisobutylene, such as methylvinylidene polyisobutylene. (For example, see U.S. Pat. No. 5,792,729, which is herein incorporated by reference).

In one embodiment, a copolymer produced by the following process may be employed (1) a copolymer of a polyalkene and an unsaturated acidic reagent and (2) a polyalkenyl derivative of an unsaturated acidic reagent, said process comprising (a) copolymerizing (1) a polyalkene containing alkylvinylidene isomer and non-alkylvinylidene isomers and (2) an unsaturated acidic reagent under polymerization conditions in the presence of a free radical initiator; and (b) reacting the product of step (a) with an unsaturated acidic reagent at elevated temperature in the presence of a strong acid. (For example, see U.S. Pat. No. 6,451,920, which is herein incorporated by reference).

Unsaturated Acidic Reagent

The unsaturated acidic reagent used in the preparation of the copolymers of the present invention comprises a maleic reactant of the general formula

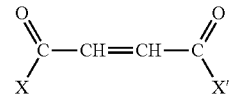

wherein X and X' are the same or different, provided that at least one of X and X' is a group that is capable of reacting to esterify alcohols, form amides or amine salts with ammonia or amines, form metal salts with reactive metals or basically reacting metal compounds and otherwise function to acylate. Preferably, X and X' are such that both carboxylic functions can enter into acylation reactions. Preferred are acidic reagents where X and X' are each independently selected from the group consisting of —OH, —Cl, —O— lower alkyl and when taken together, X and X' are —O— to form a succinic anhydride group. Maleic anhydride is the most preferred unsaturated acidic reagent.

Preparation of the Starting Copolymer

As noted above, the starting copolymer of the present invention is prepared by reacting an olefin and an unsaturated acidic reactant in the presence of a free radical initiator. One method of preparing the copolymer is described in Harrison, U.S. Pat. No. 5,112,507, which is herein incorporated by reference in its entirety. Other suitable methods of preparation are described in Harrison et al., U.S. Pat. Nos. 5,112,507; 5,175,225; 5,565,528; 5,616,668; 5,753,597; 5,792,729; 6,015,776; 6,146,431; 6,451,920; 6,617,396; 6,906,011 which are herein incorporated by reference.

The reaction may be conducted at a temperature of about −30° C. to about 210° C., preferably from about 40° C. to about 160° C. The degree of polymerization is inversely proportional to temperature. Accordingly, for the preferred high molecular weight copolymers, it is advantageous to employ lower reaction temperatures. For example, if the reaction is conducted at about 138° C., an average degree of polymerization of about 1.3 was obtained. However, if the reaction was conducted at a temperature of about 40° C. an average degree of polymerization of about 10.5 was obtained.

The reaction may be conducted neat, that is, both the high molecular weight olefin, acidic reactant and the free radical initiator are combined in the proper ratio, and then stirred at the reaction temperature.

Alternatively, the reaction may be conducted in a diluent. For example, the reactants may be combined in a solvent. Suitable solvents include those in which the reactants and free radical initiator are soluble and include acetone, tetrahydrofuran, chloroform, methylene chloride, dichloroethane, toluene, dioxane, chlorobenzene, xylenes, or the like. After the reaction is complete, volatile components may be stripped off. When a diluent is employed, it is preferably inert to the reactants and products formed and is generally used in an amount sufficient to ensure efficient mixing.

In the preparation of polyPIBSA, improved results are obtained by using PIBSA or polyPIBSA as a solvent for the reaction.

In general, the copolymerization can be initiated by any free radical initiator. Such initiators are well known in the art. However, the choice of free radical initiator may be influenced by the reaction temperature employed.

The preferred free-radical initiators are the peroxide-type polymerization initiators and the azo-type polymerization initiators. Radiation can also be used to initiate the reaction, if desired.

The peroxide-type free-radical initiator can be organic or inorganic, the organic having the general formula: $R_3 OOR'_3$ where $R_3$ is any organic radical and $R'_3$ is selected from the group consisting of hydrogen and any organic radical. Both $R_3$ and $R'_3$ can be organic radicals, preferably hydrocarbon, aroyl, and acyl radicals, carrying, if desired, substituents such as halogens, etc. Preferred peroxides include di-tert-butyl peroxide, dicumyl peroxide, and di-tert-amyl peroxide.

Examples of other suitable peroxides, which in no way are limiting, include benzoyl peroxide; lauroyl peroxide; other tertiary butyl peroxides; 2,4-dichlorobenzoyl peroxide; tertiary butyl hydroperoxide; cumene hydroperoxide; diacetyl peroxide; acetyl hydroperoxide; diethylperoxycarbonate: tertiary butyl perbenzoate; and the like.

The azo-type compounds, typified by alpha,alpha'-azobisisobutyronitrile, are also well-known free-radical promoting materials. These azo compounds can be defined as those having present in the molecule group —N=N wherein the balances are satisfied by organic radicals, at least one of which is preferably attached to a tertiary carbon. Other suitable azo compounds include, but are not limited to, p-bromobenzenediazonium fluoroborate; p-tolyldiazoaminobenzene; p-bromobenzenediazonium hydroxide; azomethane and phenyldiazonium halides. A suitable list of azo-type compounds can be found in U.S. Pat. No. 2,551,813, issued May 8, 1951 to Paul Pinkney.

The amount of initiator to employ, exclusive of radiation, of course, depends to a large extent on the particular initiator chosen, the high molecular olefin used and the reaction conditions. The initiator must, of course, be soluble in the reaction medium. The usual concentrations of initiator are between 0.001:1 and 0.2:1 moles of initiator per mole of acidic reactant, with preferred amounts between 0.005:1 and 0.10:1.

The polymerization temperature must be sufficiently high to break down the initiator to produce the desired free-radicals. For example, using benzoyl peroxide as the initiator, the reaction temperature can be between about 75° C. and about 90° C., preferably between about 80° C. and about 85° C. higher and lower temperatures can be employed, a suitable broad range of temperatures being between about 20° C. and about 200° C., with preferred temperatures between about 50° C. and about 150° C.

The reaction pressure should be sufficient to maintain the solvent in the liquid phase. Pressures can therefore vary between about atmospheric and 100 psig or higher, but the preferred pressure is atmospheric.

The reaction time is usually sufficient to result in the substantially complete conversion of the acidic reactant and high molecular weight olefin to copolymer. The reaction time is suitable between one and 24 hours, with preferred reaction times between 2 and 10 hours.

As noted above, the subject reaction is a solution-type polymerization reaction. The high molecular weight olefin, acidic reactant, solvent and initiator can be brought together in any suitable manner. The important factors are intimate contact of the high molecular weight olefin and acidic reactant in the presence of a free-radical producing material. The reaction, for example, can be conducted in a batch system where the high molecular weight olefin is added all initially to a mixture of acidic reactant, initiator and solvent or the high molecular weight olefin can be added intermittently or continuously to the reactor. Alternatively, the reactants may be combined in other orders: for example, acidic reactant and initiator may be added to high molecular weight olefin in the reactor. In another manner, the components in the reaction mixture can be added continuously to a stirred reactor with continuous removal of a portion of the product to a recovery train or to other reactors in series. In yet another manner, the reaction may be carried out in a batch process, wherein the high molecular weight olefin is added initially to the reactor, and then the acidic reactant and the initiator are added gradually over time. The reaction can also suitably take place in a coil-type reactor where the components are added at one or more points along the coil.

(B) The Amine Compounds

First Amine: A Hydrocarbyl Di-Primary Amine Linking Agent

In the present invention, the starting copolymer is reacted with a diamine compound linking agent, thereby producing a hybrid succinic anhydride copolymer. The diamine compound linking agent is a hydrocarbyl di-primary amine, wherein the hydrocarbyl group is an aliphatic or aromatic group which contains only hydrogen and carbon and further wherein the molecular weight of the hydrocarbyl di-primary amine is no more than about 330. Examples of suitable di-primary amines are ethylene diamine, propylene diamine, butylene diamine, 1,5-diaminopentane, 1,6-diaminohexane, 1,7-diaminoheptane, 1,8-diaminooctane, 1,9-diaminononane, 1,10-diaminodecane, 1,11-diaminoundecane, 1,12-diaminododecane, 1,13-diaminotridecane, 1,14-diaminotetradecane, 4,4-diaminobenzene, m-xylylenediamine, p-phenylene diamine, 4,4'oxydianiline, and the like. Preferably, the hydrocarbyl di-primary amine is ethylene diamine, propylene diamine, 1,6-diaminohexane, or 1,12-diaminododecane. Preferably, the ratios of linking diamines to anhydride groups ranges from about 0.05:1 to about 0.45:1, more preferably from about 0.10:1 to about 040:1 even more preferably from about 0.15:1 to about 0.30:1, and most preferably from about 0.125:1 to about 0.25:1.

Succinimide Derived from Hybrid Succinic Anhydride Copolymer

Second Amine

In a further embodiment of the invention, the hybrid succinic anhydride copolymer is reacted with a second amine thereby producing a succinimide. Preferably, the second amine compound is an aliphatic or aromatic monoamine or polyamine or mixtures thereof. Preferably, the second amine compound is also a primary amine.

Monoamines

Suitable monoamines include methylamine, ethylamine, propylamine, isopropylamine, butylamine, iso-butylamine, sec-butylamine, pentylamine, hexylamine, heptylamine, octylamine, 2-ethylhexylamine, nonylamine, decylamine, undecylamine, dodecylamine, aniline, naphthyamine, oleylamine, cetylamine, and the like.

If an amine, i.e., a monoamine, is employed, it should be a primary amine, secondary amine, or mixtures thereof. Preferably, the amine will have at least 10 carbon atoms, more preferably between 12 and 18 carbon atoms. Although aromatic amines may be employed, it is preferred to use aliphatic amines. Both saturated and unsaturated amines may be employed. Preferred amines include aliphatic primary amines. Examples of suitable amines include, but are not limited to, octadecylamine and dodecylamine. An example of a suitable mixture of amines is tallowamine (a partially saturated mixture of amines comprised mainly of $C_{18}$ amines).

Polyamines

Preferably, the polyamine has at least three amine nitrogen atoms per molecule, and more preferably, 4 to 12 amine nitrogens per molecule. Most preferred are polyamines having from about 6 to 10 nitrogen atoms per molecule.

Preferred polyalkene polyamines also contain from about 4 to 20 carbon atoms, preferably from 2 to 3 carbon atoms per alkylene unit. The polyamine preferably has a carbon-to-nitrogen ratio of from 1:1 to 10:1.

Examples of suitable polyamines that can be used to form the succinimides of this invention include the following: tetraethylene pentamine, pentaethylene hexamine, Dow E-100 heavy polyamine ($M_n$=303, available from Dow Chemical Company), and Union Carbide HPA-X heavy polyamine ($M_n$=275, available from Union Carbide Corporation). Such polyamines encompass isomers, such as branched-chain polyamines, and substituted polyamines, including hydrocarbyl-substituted polyamines. HPA-X heavy polyamine contains an average of approximately 6.5 amine nitrogen atoms per molecule.

The polyamine reactant may be a single compound, but typically will be a mixture of compounds reflecting commercial polyamines. Typically, the commercial polyamine will be a mixture in which one or several compounds predominate with the average composition indicated. For example, tetraethylene pentamine prepared by the polymerization of aziridine or the reaction of dichloroethylene and ammonia will have both lower and higher amine members, e.g., triethylene tetramine, substituted piperazines and pentaethylene hexamine, but the composition will be largely tetraethylene pentamine and the empirical formula of the total amine composition will closely approximate that of tetraethylene pentamine.

Other examples of suitable polyamines include admixtures of amines of various molecular weights. Included are mixtures of diethylene triamine and heavy polyamine. A preferred polyamine admixture is a mixture containing 20% by weight diethylene triamine and 80% by weight heavy polyamine.

Aromatic Amines

Preferably, the aromatic amine compound is selected from the following group of aromatic compounds consisting of:

(a) an N-arylphenylenediamine represented by the formula:

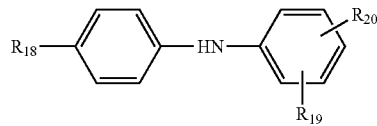

$R_{18}$ is H, —NHaryl, —NHalkaryl, or a branched or straight chain hydrocarbyl radical having from about 4 to about 24 carbon atoms selected from alkyl, alkenyl, alkoxyl, aralkyl or alkaryl; $R(2)_{19}$ is —$NH_2$, —$(NH(CH_2)_mNH_2$, —NHalkyl, —NHaralkyl, —$CH_2$-aryl-$NH_2$, in which n and m each have a value from about 1 to about 10; and $R_{20}$ is hydrogen, alkyl, alkenyl, alkoxyl, aralkyl, or alkaryl, having from about 4 to about 24 carbon atoms.

Particularly preferred N-arylphenylenediamines are N-phenylphenylenediamines (NPPDA), for example, N-phenyl-1,4-phenylenediamine, N-phenyl-1,3-phenylenediamine, and N-phenyl-1,2-phenylenediamine and N-naphthyl-1,4-phenylenediamine. Other derivatives of NPPDA may also be included, such as N-propyl-N'-phenylphenylenediamine.

(b) aminocarbazole represented by the formula:

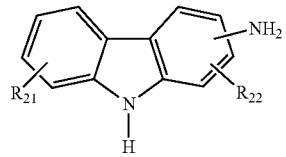

in which $R_{21}$ and $R_{22}$ each independently represent hydrogen or an alkyl or alkenyl radical having from about 1 to about 14 carbon atoms, (c) an amino-indazolinone represented by the formula:

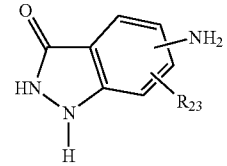

in which $R_{23}$ is hydrogen or an alkyl radical having from about 1 to about 14 carbon atoms; and (d) an aminomercaptotriazole represented by the formula:

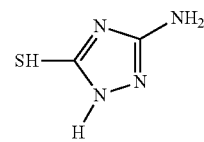

(e) an aminoperimidine represented by the formula:

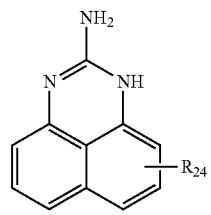

in which $R_{24}$ represents hydrogen or an alkyl radical having from about 1 to about 14 carbon atoms;

(f) an aryloxyphenyleneamine represented by the formula:

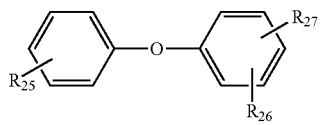

in which $R_{25}$ is H, —NHaryl, —NHalkaryl, or branched or straight chain radical having from about 4 to about 24 carbon atoms that can be alkyl, alkenyl, alkoxyl, aralkyl or alkaryl; $R_{26}$ is —$NH_2$, —$(NH(CH_2)_n)_m$ $NH_2$, —NHalkyl, or —NHaralkyl, in which n and m each have a value from about 1 to about 10: and $R_{27}$ is hydrogen, alkyl, alkenyl, alkoxyl, aralkyl, or alkaryl, having from about 4 to about 24 carbon atoms;

A particularly preferred aryloxyphenyleneamine is 4-phenoxyaniline:

(g) an aromatic amine comprising two aromatic groups, linked by a group, L, represented by the following formula:

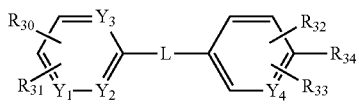

wherein L is selected from —O—, —N=N—, —NH—, —$CH_2NH$, —$C(O)NR_{28}$—, —C(O)O—, —$SO_2$—, —$SO_2NR_{29}$— or —$SO_2NH$—, wherein $R_{28}$ and $R_{29}$ independently represent a hydrogen, an alkyl, an alkenyl or an alkoxy group having from about 1 to about 8 carbon atoms;

wherein each $Y_1$, $Y_2$, $Y_3$ and $Y_4$ are independently N or CH provided that $Y_1$ and $Y_2$ may not both be N;

$R_{30}$ and $R_{31}$ independently represent a hydrogen, alkyl, aryl, alkaryl, aralkyl, alkoxy, hydroxyalkyl, aminoalkyl, —OH, —$NO_2$, —$SO_3H$, —$SO_3Na$, $CO_2H$ or salt thereof, —$NR_{41}R_{42}$ wherein $R_{41}$ and $R_{42}$ are independently hydrogen, alkyl, aryl, arylalkyl, or alkaryl;

$R_{32}$ and $R_{33}$ independently represent a hydrogen, an alkyl, an alkenyl or an alkoxy group having from about 1 to about 8 carbon atoms, —OH, —$SO_3H$ or —$SO_3Na$;

$R_{34}$ represents —$NH_2$, —$NHR_{35}$, wherein $R_{35}$ is an alkyl or an alkenyl group having from about 1 to about 8 carbon atoms, —$CH_2$—$(CH_2)_n$—$NH_2$ or —$CH_2$-aryl-$NH_2$ and n is from 0 to about 10;

(h) an aminothiazole selected from the group consisting of aminothiazole, aminobenzothiazole, aminobenzothiadiazole and aminoalkylthiazole;

(i) an amino indole represented by the formula:

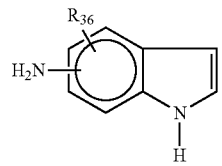

wherein $R_{36}$ represents a hydrogen, an alkyl or an alkenyl group having from about 1 to about 14 carbon atoms:

(j) an aminopyrrole represented by the formula:

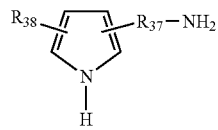

wherein $R_{37}$ represents a divalent alkylene group having about 2 to about 6 carbon atoms and $R_{36}$ represents a hydrogen, an alkyl or an alkenyl group having from about 1 to about 14 carbon atoms;

(k) a ring substituted or unsubstituted aniline, such as nitroaniline or 4-aminoacetanilide;

(l) an aminoquinoline;

(m) an aminobenzimidazole;

(n) a N,N-dialkylphenylenediamine;

(o) a benzylamine; and (p) a benzyl alcohol.

The compounds described above in (g)-(o) are substantially described, for example, in Published U.S. Patent Application No. US20060025316, the disclosure of which is herein incorporated by reference.

The above-described amine compounds can be used alone or in combination with each other. Other aromatic amines can include such amines as aminodiphenylamine. These additional amines can be included for a variety of reasons.

In one embodiment, the preferred aromatic amine compound is either N-arylphenylenediamine or phenoxyaniline. More preferred the aromatic amine compound is N-arylphenylenediamine. Particularly preferred N-arylphenylenediamines are the N-phenylphenylenediamines, such as for example, N-phenyl-1,4-phenylenediamine, N-phenyl-1,3-phenylenediamine, and N-phenyl-1,2-phenylenediamine.

In one embodiment, the preferred aromatic amine compound is either N-arylphenylenediamine or phenoxyaniline. More preferred the aromatic amine compound is N-arylphenylenediamine. Particularly preferred N-arylphenylenediamines are the N-phenylphenylenediamines, such as for example, N-phenyl-1,4-phenylenediamine, N-phenyl-1,3-phenylenediamine, and N-phenyl-1,2-phenylenediamine.

In one embodiment, the preferred aromatic compound is 4-(4-nitrophenylazo)aniline, 4-phenylazoanline, N-(4-aminophenyl)acetamide, 4-benzoylamine-2,5-dimethoxyaniline, 4-phenoxyl aniline, or 3-nitroniline.

C. The Succinimide

The hybrid succinic anhydride copolymer product can then react further with an amine to produce a succinimde. The succinimides of the present invention are prepared by reacting the remaining anhydride groups of the hybrid PIBSAs of the present invention with an aliphatic or aromatic monoamine or polyamine, or mixtures thereof. A range of charge mole ratios of amine to remaining anhydride can be used. When an amine is reacted with a hybrid succinic anhydride copolymer, a charge mole ratio of amine to remaining anhydride of 1.0 will react with all of the remaining anhydride moieties to produce a succinimide that is not further cross linked. The succinimide made from hybrid succinic anhydride copolymer with a mono-amine using a CMR of 1.0 has the general formula:

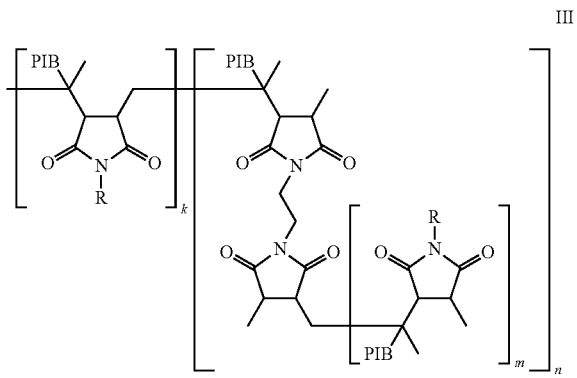

Wherein R is an aliphatic or aromatic group; and n, m, and k are 1 to 20.

When a polyamine is reacted with a hybrid succinic anhydride copolymer, different charge mole ratios of amine to remaining anhydride may produce different products. For example when a polyamine that contains at least two —NH₂ groups is reacted with a hybrid PIBSA using a CMR of polyamine to remaining anhydride of 1.0, a mono-hybrid PIBSA succinimide may be produced which has the general formula:

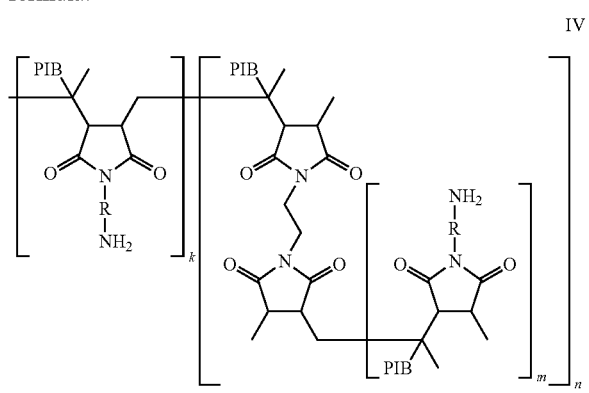

Wherein R is alkyl, aryl, or polyamino containing at least one amine nitrogen atom and from about 4 to 20 carbon atoms; and n, m, and k are 1 to 20. Preferably R is polyamino containing at least three nitrogen atoms and about 4 to 20 carbon atoms, n, m, and k are 1 to 10.

In addition when a polyamine that contains at least two —NH₂ groups is reacted with a hybrid succinic anhydride copolymer using a CMR of polyamine to remaining anhydride of 0.5, a bis-hybrid PIBSA succinimide may be produced which has the general formula:

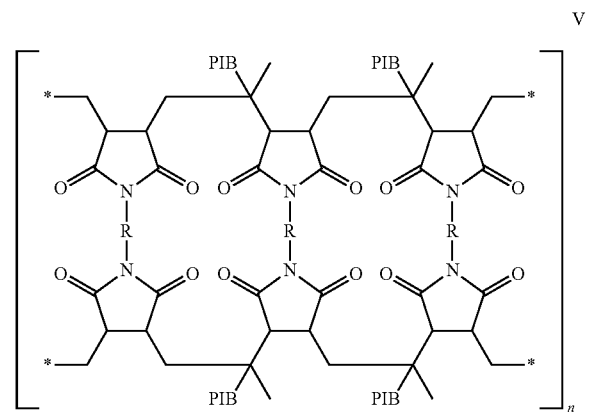

Wherein R is alkyl, aryl, or polyamino containing at least one amine nitrogen atom and from about 4 to 20 carbon atoms, and n is 1 to 20. Preferably R is polyamino containing at least three nitrogen atoms and about 4 to 20 carbon atoms, and n is 1 to 10.

Obviously when a hybrid succinic anhydride copolymer is reacted with a polyamine that contains at least two —NH₂ groups using a CMR of polyamine to remaining anhydride which is in between 1.0 and 0.5 a mixture of structures which are intermediate between structures IV and V may be formed.

In another embodiment, a polyamine is reacted with a hybrid succinic anhydride copolymer using an amine to anhydride CMR of 0.1 to 0.5.

(D) Method of Making the Hybrid Succinic Anhydride Copolymer

The hybrid succinic anhydride copolymer of the present invention is prepared by a process comprising charging the reactant copolymer in a reactor, optionally under a nitrogen purge, and heating at a temperature of from about 80° C. to about 170° C. Optionally, a diluent oil may be charged optionally under a nitrogen purge in the same reactor. A linking di-amine compound is charged, optionally under a nitrogen purge, to the reactor. This mixture is heated under a nitrogen purge to a temperature in range from about 130° C. to about 200° C., thereby producing a hybrid succinic anhydride copolymer. Optionally, a vacuum is applied to the mixture for about 0.5 to about 2.0 hours to remove excess water. The hybrid succinic anhydride copolymer may be isolated and stored, or further reacted with the second amine compound.

(E) Method of Making the Succinimide Additive Composition

The succinimide is prepared by a process comprising charging the hybrid succinic anhydride copolymer in a reactor, optionally under a nitrogen purge, and heating at a temperature of from about 110° C. to about 200° C., preferably from about 130 C to about 180 C, more preferably, from about 150 C to about 170 C. Optionally, a diluent oil may be charged optionally under a nitrogen purge in the same reactor. A second amine compound is charged, optionally under a nitrogen purge, to the reactor. This mixture is heated under a nitrogen purge to a temperature in range from about 110° C. to about 200° C., preferably from about 130° C. to about 180° C., more preferably, from about 150° C. to about 170° C. Optionally, a vacuum is applied to the mixture for about 0.5 to about 2.0 hours to remove excess water.

The succinimide additive composition may also be prepared by a process comprising charging the isolated hybrid succinic anhydride copolymer in a reactor, under a nitrogen purge, and heating at a temperature of from about 110° C. to about 200° C., preferably from about 130° C. to about 180° C., more preferably, from about 150° C. to about 170° C. Optionally, a diluent oil may be charged optionally under a nitrogen purge in the same reactor. A second amine compound is charged, optionally under a nitrogen purge, to the reactor. This mixture is heated under a nitrogen purge to a temperature in range from about 110° C. to about 200° C., preferably from about 130° C. to about 180° C., more preferably, from about 150° C. to about 170° C. Optionally, a vacuum is applied to the mixture for about 0.5 to about 2.0 hours to remove excess water.

Quite surprisingly it has been found that the order of addition of the diamine, the copolymer, and the polyamine are important when making the succinimide. For example, when one first reacts a diamine with a copolymer to produce the hybrid PIBSA, and then reacts the hybrid PIBSA with a polyamine, one obtains a product with lower viscosity than when one reacts the diamine, copolymer, and polyamine together at the same time. It is believed that the reason for the lower viscosity is because when one reacts a diamine with a copolymer first, followed by the reaction of the hybrid PIBSA with the polyamine, the succinimide that is formed has less cross-linking than the product that is formed by reacting the diamine, copolymer and polyamine together at the same time.

One or more of the reactants can be charged at an elevated temperature to facilitate mixing and reaction. A static mixer can be used to facilitate mixing of the reactants as they are being charged to the reactor. The reaction is carried out for about 0.5 to 2 hours at a temperature from about 130° C. to 200° C. Optionally a vacuum is applied to the reaction mixture during the reaction period.

(F) Post-Treatment of the Succinimide

In one embodiment of the present invention, the succinimide derived from a hybrid succinic anhydride (e.g., hybrid PIBSA) is post-treated with at least one post-treating agent. It has been discovered that post-treating the succinimide derived from a hybrid PIBSA results in improved dispersancy.

Preferably, the post-treating agent is a cyclic carbonate, mono-carbonate, aromatic polycarboxylic anhydride, or aromatic polycarboxylic acid esters. More preferred, the post-treating agent is ethylene carbonate, phthalic anhydride or mixtures thereof.

Typical cyclic carbonates for use in this invention include the following: 1,3-dioxolan-2-one (ethylene carbonate): 4-methyl-1,3-dioxolan-2-one (propylene carbonate); 4-hydroxymethyl-1,3-dioxolan-2-one: 4,5-dimethyl-1,3-dioxolan-2-one; 4-ethyl-1,3-dioxolan-2-one (buthylene carbonate): 4,4-dimethyl-1,3-dioxolan-2-one: 4-methyl-5-ethyl-1,3-dioxolan-2-one; 4,5-diethyl-1,3-dioxolan-2-one; 4,4-diethyl-1,3-dioxolan-2-one; 1,3-dioxan-2-one; 44-dimethyl-1,3-dioxan-2-one; 5,5-dimethyl-1,3-dioxan-2-one: 5,5-dihydroxymethyl-1,3-dioxan-2-one; 5-methyl-1,3-dioxan-2-one; 4-methyl-1,3-dioxan-2-one, 5-hydroxy-1,3-dioxan-2-one; 5-hydroxymethyl-5-methyl-1,3-dioxan-2-one; 5,5-diethyl-1,3-dioxan-2-one; 5-methyl-5-propyl-1,3-dioxan-2-one; 4,6-dimethyl-1,3-dioxan-2-one; 4,4,6-trimethyl-1,3-dioxan-2-one and spiro[1,3-oxa-2-cyclohexanone-5,5'-1',3'-oxa-2'-cyclohexanone]. Other suitable cyclic carbonates may be prepared from sacchrides such as sorbitol, glucose, fructose, galactose and the like and from vicinal diols prepared from $C_1$-$C_{30}$ olefins by methods known in the art.

Several of these cyclic carbonates are commercially available such as 1,3-dioxolan-2-one or 4-methyl-1,3-dioxolan-2-one. Cyclic carbonates may be readily prepared by known reactions. For example, reaction of phosgene with a suitable alpha alkane diol or an alkan-1,3-diol yields a carbonate for use within the scope of this invention as for instance in U.S. Pat. No. 4,115,206 which is incorporated herein by reference.

Likewise, the cyclic carbonates useful for this invention may be prepared by transesterification of a suitable alpha alkane diol or an alkan-1,3-diol with, e.g., diethyl carbonate under transesterification conditions. See, for instance, U.S. Pat. Nos. 4,384,115 and 4,423,205 which are incorporated herein by reference for their teaching of the preparation of cyclic carbonates.

Typical linear mono-carbonates include diethyl carbonate, dimethyl carbonate, dipropyl carbonate and the like. Typical linear poly-carbonates include poly(propylene carbonate) and the like.

Typical aromatic polycarboxylic anhydrides include 2,3-pyrazinedicarboxylic anhydride; 2,3-pydridinedicarboxylic anhydride; 3,4-pyridinedicarboxylic anhydride; diphenic anhydride; isatoic anhydride; phenyl succinic anhydride; 1-naphthalene acetic anhydride; 1,2,4-benzene tricarboxylic anhydride and the like. Typical aromatic polycarboxylic acids include the acids of the aforementioned anhydrides.

Typical aromatic polycarboxylic acid esters include dimethyl phthalate, diethyl phthalate, dimethylhexyl phthalate, mono methylhexyl phthalate, mono ethyl phthalate, and mono methyl phthalate.

In one embodiment, the post-treating agent is a cyclic carbonate or a linear mono- or poly-carbonate. In another embodiment, the post-treating agent is an aromatic polycarboxylic acid, anhydride or ester.

Preferably, the succinimide of the presently claimed invention is post-treated with a post-treating agent that is selected from ethylene-carbonate, phthalic anhydride, or naphthalic anhydride.

Typically, the post-treating agent (i.e., ethylene carbonate, phthalic anhydride, or 1,8-naphthalic anhydride) is added to the reactor containing the succinimide of the presently claimed invention, thereby producing a post-treated succinimide.

(G) Lubricating Oil Composition

The lubricating oil additive composition (i.e., succinimide) or the post-treated succinimide described above is generally added to a base oil that is sufficient to lubricate moving parts, for example internal combustion engines, gears, and transmissions. Typically, the lubricating oil composition of the present invention comprises a major amount of oil of lubricating viscosity and a minor amount of the lubricating oil additive composition.

The base oil employed may be any of a wide variety of oils of lubricating viscosity. The base oil of lubricating viscosity used in such compositions may be mineral oils or synthetic oils. A base oil having a viscosity of at least 2.5 cSt at 40° C. and a pour point below 20° C., preferably at or below 0° C., is desirable. The base oils may be derived from synthetic or natural sources. Mineral oils for use as the base oil in this invention include, for example, paraffinic, naphthenic and other oils that are ordinarily used in lubricating oil compositions. Synthetic oils include, for example, both hydrocarbon synthetic oils and synthetic esters and mixtures thereof having the desired viscosity. Hydrocarbon synthetic oils may include, for example, oils prepared from the polymerization of ethylene, polyalphaolefin or PAO oils, or oils prepared from hydrocarbon synthesis procedures using carbon monoxide and hydrogen gases such as in a Fisher-Tropsch process. Useful synthetic hydrocarbon oils include liquid polymers of alpha olefins having the proper viscosity. Especially useful are the hydrogenated liquid oligomers of $C_6$ to $C_{12}$ alpha olefins such as 1-decene timer. Likewise, alkyl benzenes of proper viscosity, such as didodecyl benzene, can be used. Useful synthetic esters include the esters of monocarboxylic acids and polycarboxylic acids, as well as monohydroxy alkanols and polyols. Typical examples are didodecyl adipate, pentaerythritol tetracaproate, di-2-ethylhexyl adipate, dilaurylsebacate, and the like. Complex esters prepared from mixtures of mono and dicarboxylic acids and mono and dihydroxy alkanols can also be used. Blends of mineral oils with synthetic oils are also useful.

Thus, the base oil can be a refined paraffin type base oil, a refined naphthenic base oil, or a synthetic hydrocarbon or non-hydrocarbon oil of lubricating viscosity. The base oil can also be a mixture of mineral and synthetic oils.

(H) Lubricating Oil Concentrate

Lubricating oil concentrates are also envisioned. These concentrates usually include from about 90 wt % to about 10 wt %, preferably from about 90 wt % to about 50 wt %, of an oil of lubricating viscosity and from about 10 wt % to about 90 wt % of the lubricating oil additive composition (i.e., succinimide derived from a hybrid succinic anhydride copolymer or post-treated succinimide) described herein. Typically, the concentrates contain sufficient diluent to make them easy to handle during shipping and storage. Suitable diluents for the concentrates include any inert diluent, preferably an oil of lubricating viscosity, so that the concentrate may be readily mixed with lubricating oils to prepare lubricating oil compositions. Suitable lubricating oils that may be used as diluents typically have viscosity in the range from about 35 to about 500 Saybolt Universal Seconds (SUS) at 100 degrees F. (38 degrees C.), although any oil of lubricating viscosity may be used.

(I) Other Additives

In one embodiment of the present invention, the following additive components are examples of some of the components that may be favorably employed in the lubricating oil composition.

These examples of additives are provided to illustrate the present invention, but they are not intended to limit it:

1. Metal Detergents

Sulfurized or unsulfurized alkyl or alkenyl phenates, alkyl or alkenyl aromatic sulfonates, borated sulfonates, sulfurized or unsulfurized metal salts of multi-hydroxy alkyl or alkenyl aromatic compounds, alkyl or alkenyl hydroxy aromatic sulfonates, sulfurized or unsulfurized alkyl or alkenyl naphthenates, metal salts of alkanoic acids, metal salts of an alkyl or alkenyl multiacid, and chemical and physical mixtures thereof.

2. Anti-Oxidants

Anti-oxidants reduce the tendency of oils to deteriorate upon exposure to oxygen and heat. This deterioration is evidenced by the formation of sludge and varnish-like deposits, an increase in viscosity of the oil, and by an increase in corrosion or wear. Examples of anti-oxidants useful in the present invention include, but are not limited to, phenol type (phenolic) oxidation inhibitors, such as 4,4"-methylene-bis(2,6-di-tert-butylphenol), 4,4'-bis(2,6-di-tert-butylphenol), 4,4'-bis(2-methyl-6-tert-butylphenol), 2,2°-methylene-bis(4-methyl-6-tert-butylphenol), 4,4'-butylidene-bis(3-methyl-6-tert-butylphenol), 4,4'-isopropylidene-bis(2,6-di-tert-butylphenol), 2,2'-methylene-bis(4-methyl-6-nonylphenol), 2,2'-isobutylidene-bis(4,6-dimethylphenol), 2,2'-5-methylene-bis(4-methyl-6-cyclohexylphenol), 2,6-di-tert-butyl-4-methylphenol, 2,6-di-tert-butyl-4-ethylphenol, 2,4-dimethyl-6-tert-butyl-phenol, 2,6-di-tert-1-dimethylamino-p-cresol, 2,6-di-tert-4-(N,N'-dimethylaminomethylphenol), 4,4'-thiobis(2-methyl-6-tert-butylphenol), 2,2'-thiobis(4-methyl-6-tert-butylphenol), bis(3-methyl-4-hydroxy-5-tert-10-butylbenzyl)-sulfide, and bis(3,5-di-tert-butyl-4-hydroxybenzyl). Diphenylamine-type oxidation inhibitors include, but are not limited to, alkylated diphenylamine, phenyl-alpha-naphthylamine, and alkylated-alpha-naphthylamine. Sulfur-containing oxidation inhibitors include ashless sulfides and polysulfides, metal dithiocarbamate (e.g., zinc dithiocarbamate), and 15-methylenebis(dibutyldithiocarbamate). Phosphorus compounds especially the alkyl phosphites, sulfur-phosphorus compounds, and copper compounds may also be used as antioxidants.

3 Anti-Wear Agents

Anti-wear agents reduce wear of moving metallic parts in conditions of continuous and moderate loads. Examples of such agents include, but are not limited to, phosphates and thiophosphates and salts thereof, carbamates, esters, and molybdenum complexes. Especially preferred antiwear compounds are the amine phosphates.

4. Rust Inhibitors (Anti-Rust Agents)

Rust inhibitors correct against the corrosion of ferrous metals. These include (a) Nonionic polyoxyethylene surface active agents such as polyoxyethylene lauryl ether, polyoxyethylene higher alcohol ether, polyoxyethylene nonyl phenyl ether, polyoxyethylene octyl phenyl ether, polyoxyethylene octyl stearyl ether, polyoxyethylene oleyl ether, polyoxyethylene sorbitol monostearate, polyoxyethylene sorbitol monooleate, and polyethylene glycol monooleate; and (b) miscellaneous other compounds such as stearic acid and other fatty acids, dicarboxylic acids, metal soaps, fatty acid amine salts, metal salts of heavy sulfonic acid, partial carboxylic acid ester of polyhydric alcohol, and phosphoric ester.

5. Demulsifiers

Demulsifiers promote the separation of oil from water which may come into contact with the oil through contamination. Demulsifiers include addition product of alkylphenol and ethylene oxide, polyoxyethylene alkyl ether, and polyoxyethylene sorbitan ester.

6. Extreme Pressure Agents (EP Agents)

Extreme pressure agents reduce wear of moving metallic parts in conditions of high loads. Examples of EP agents include sulfurized olefins, zinc dialky-1-dithiophosphate (primary alkyl, secondary alkyl, and aryl type), diphenyl sulfide, methyl trichlorostearate, chlorinated naphthalene, fluoroalkylpolysiloxane, lead naphthenate, neutralized or partially neutralized phosphates, dithiophosphates, and sulfur-free phosphates.

7 Friction Modifiers

Fatty alcohol, fatty acid (stearic acid, isostearic acid, oleic acid and other fatty acids or salts thereof), amine, borated ester, other esters, phosphates, other phosphites besides tri- and di-hydrocarbyl phosphites, and phosphonates.

8. Multifunctionl Additives

Some additives function to provide many functionalities simultaneously. In particular, the zinc aryl and alkyl dithiophosphates can simultaneously provide antiwear, extreme pressure, and oxidation inhibition. Especially preferred are the alkaryl, primary alkyl, and secondary alkyl zinc dithiophosphates. Primary alkyl zinc dithiophosphates are especially preferred.

9. Viscosity Index Improvers

Viscosity index improvers are used to increase the viscosity index of lubricating oils, thereby reducing the viscosity decrease of an oil with increasing temperature. Polymethacrylate polymers, ethylene-propylene copolymers, styrene-isoprene copolymers, hydrated styrene-isoprene copolymers, and polyisobutylene are all used as viscosity index improvers. Particularly preferred viscosity index improvers are the polymethacrylate polymers. Nitrogen- and oxygen-functionalized polymers, the so-called dispersant viscosity index improvers, may also be used.

10. Pour Point Depressants

Pour point depressants lower the temperature at which waxes precipitate out of lubricating oils, thus extending the temperature range in which the lubricating oil can operate before oil flow is impeded. Pour point depressants include polymethyl methacrylates, ester-olefin copolymers especially ethylene vinyl acetate copolymers, and others 11. Foam Inhibitors Foam inhibitors work to accelerate the release of gas entrained in a lubricant during operation. Common foam inhibitors include alkyl methacrylate polymers and dimethylsiloxane polymers.

12. Metal Deactivators

Metal deactivators hinder corrosion of metal surfaces, and chelate metal ions in solution in lubricating oils, thereby reducing oxidation caused by the catalytic effect of the metal ion. Common metal deactivators includes salicylidene propylenediamine, triazole derivatives, mercaptobenzothiazoles, thiadiazole derivatives, and mercaptobenzimidazoles.

13. Dispersants

Alkenyl succinimides, alkenyl succinimides modified with other organic compounds, alkenyl succinimides modified by post-treatment with ethylene carbonate or boric acid, esters of polyalcohols and polyisobutenyl succinic anhydride, phenate-salicylates and their post-treated analogs, alkali metal or mixed alkali metal, alkaline earth metal borates, dispersions of hydrated alkali metal borates, dispersions of alkaline-earth metal borates, polyamide ashless dispersants and the like or mixtures of such dispersants.

(J) Method of Use of the Present Invention

The lubricating oil additive composition (i.e., succinimide derived from a hybrid succinic anhydride copolymer) or post-treated succinimide additive composition of the present invention is added to an oil of lubricating viscosity thereby producing a lubricating oil composition. The lubricating oil composition contacts the engine, improving the dispersancy properties of the lubricating oil composition. Accordingly, the present invention is also directed to a method of improving dispersancy in an internal combustion engine which comprises operating the engine with the lubricating oil composition of the invention.

(K) Fuel Compositions

When used in fuels, the proper concentration of the additive composition (e.g., succinimide derived from a hybrid succinic anhydride copolymer or post-treated succinimide) necessary in order to achieve the desired effect is dependent upon a variety of factors including the type of fuel used, the presence of other detergents or dispersants or other additives, etc. Generally, however, and in one embodiment, the range of concentration of the additive in the base fuel is 10 to 10,000 weight parts per million, preferably from 30 to 5000 parts per million of the additive per part of base fuel. If other detergents are present, a lesser amount of the additive may be used. The succinimide or post-treated succinimide additives, derived from a hybrid succinic anhydride copolymer, of this invention may be formulated as a fuel concentrate, using an inert stable oleophilic organic solvent boiling in the range of about 150° F. to 400° F. Preferably, an aliphatic or an aromatic hydrocarbon solvent is used, such as benzene, toluene, xylene or higher-boiling aromatics or aromatic thinners. Aliphatic alcohols of about 3 to 8 carbon atoms, such as isopropanol, isobutylcarbinol, n-butanol and the like, in combination with hydrocarbon solvents are also suitable for use with the fuel additive.

In the fuel concentrate, the amount of the additive will be ordinarily at least 5 percent by weight and generally not exceed 70 percent by weight, preferably from 5 to 50 and more preferably from 10 to 25 weight percent.

In gasoline fuels, other fuel additives may be employed with the additives of the present invention, including, for example, oxygenates, such as t-butyl methyl ether, antiknock agents, such as methylcyclopentadienyl manganese tricarbonyl, and other dispersants/detergents, such as hydrocarbyl amines, hydrocarbyl poly(oxyalkylene)amines, hydrocarbyl poly(oxyalkylene)aminocarbamates, succinimides, or Mannich bases. Additionally, antioxidants, metal deactivators and demulsifiers may be present.

In diesel fuels, other well-known additives can be employed, such as pour point depressants, flow improvers, cetane improvers, and the like.

The following examples are presented to illustrate specific embodiments of this invention and are not to be construed in any way as limiting the scope of the invention.

EXAMPLES

Example 1

Preparation of polyPIBSA 1000

4005 grams of high methylvinylidene polyisobutene having a number average molecular weight ($M_n$) of about 1000 and a methylvinylidene content of about 76% (which is commercially available from BASF and is known as Glissopal 1000) was charged to a reactor and the reactor was heated to a temperature of about 150° C. 589 grams maleic anhydride and 54.14 grams of dicumyl peroxide were fed to the reactor. The temperature of the reactor was maintained at 150° C. for 1.0 hour after the maleic anhydride and dicumyl peroxide are charged to the reactor. The reactor was heated to about 200° C. over a period of about 1.0 hour, after which a vacuum was applied to reduce the pressure to 0 psia while maintaining the temperature at 200° C. The reactor was held under vacuum pressure for about 1.5 hours at 200° C. The reactor pressure was then increased to ambient conditions and the product was then filtered to provide the neat product.

Example 2

Preparation of polyPIBSA 2300

The process of Example 1 was repeated except that 2300Mn weight polyisobutylene was substituted for the 1000Mn weight polyisobutylene.

Example 3

Preparation of Hybrid PIBSA Copolymer from Ethylene Diamine and PolyPIBSA 1000 Using Amine/Anhydride CMR=0.125

PolyPIBSA 1000 (SAP number=83.7 mgKOH/g, 51.5% actives in diluent oil), as prepared in example 1, was used for these examples. PolyPIBSA (1000 g, 746 mmol) was added to a 3000 ml, four neck round bottom flask equipped with a Dean Stark trap, a mechanical stirrer and a dripping addition funnel. Ethylene diamine (5.61 g, 93.2 mmol) was then added drop-wise at 90-100° C. After addition was complete, the temperature of the reaction was raised to 165° C. under a nitrogen atmosphere. The reaction was held at 165° C. for 2 hours. Then the reaction was cooled to give the hybrid succinic anhydride copolymer; 0.3% N, SAP number=60.2 mg KOH/g, viscosity@100° C.=168.4 cSt. This is shown in Table 1.

Examples 4-5

Preparation of Hybrid PIBSA Copolymer from Ethylene Diamine (EDA) and PolyPIBSA 1000 Using other Amine/Anhydride CMR The procedure of Example 3 was followed exactly except that different amine/anhydride CMR ratios were used. The hybrid succinic anhydride copolymers chemical and physical data are reported in Table 1.

TABLE 1

Hybrid PIBSA copolymer made from polyPIBSA 1000 and ethylene diamine (EDA).

| Example | Amine/anhydride CMR | polyPIBSA 1000 (g) | % unreacted anhydride | Amine EDA (g) | % N | Vis @ 100 C., cSt | SAP No. mgKOH/g |
|---|---|---|---|---|---|---|---|
| 3 | 0.125 | 1000 | 25 | 5.61 | 0.30 | 168 | 60.2 |
| 4 | 0.19 | 1000 | 38 | 8.52 | 0.42 | 189 | 44.1 |
| 5 | 0.25 | 1083 | 50 | 12.14 | 0.58 | 228 | 43.0 |

Examples 6-8

Preparation of Hybrid PIBSA Copolymer from 1,6-diaminohexane and PolyPIBSA 1000

PolyPIBSA 1000 (SAP number=83.7 mgKOH/g, 51.5% actives in diluent oil), as prepared in example 1, was used for these examples. PolyPIBSA was added to a 3000 ml, four neck round bottom flask equipped with a Dean Stark trap, a mechanical stirrer and a dripping addition funnel. 1,6-diaminohexane (DAH) was crushed and then added as a powder at 35° C. The temperature of the reaction was raised to 165° C. after addition of the amine under a nitrogen atmosphere. The samples were taken immediately after addition of the amine and every hour afterwards to study the progress of the reaction. The product was the hybrid PIBSA copolymer 1000 with DAH. The chemical and physical properties of this product are shown in Table 2.

TABLE 2

Hybrid PIBSA copolymer made from polyPIBSA 1000 and 1,6-diaminohexane (DAH)

| Example | Amine/anhydride CMR | polyPIBSA 1000 (g) | % unreacted anhydride | Amine DAH (g) | % N | Vis @ 100 C., cSt | SAP No. mgKOH/g |
|---|---|---|---|---|---|---|---|
| 6 | 0.125 | 700 | 25 | 7.66 | 0.29 | 178 | 44.3 |
| 7 | 0.19 | 700 | 38 | 11.65 | 0.46 | 217 | 31.0 |
| 8 | 0.25 | 700 | 50 | 15.32 | 0.5 | 261 | 16.3 |

Examples 9-11

Preparation of Hybrid PIBSA Copolymer from 1,12-diaminododecane (DADD) and PolyPIBSA 1000

PolyPIBSA 1000 (SAP number=83.7 mgKOH/g, 51.5% actives in diluent oil), as prepared in example 1, was used for these examples. PolyPIBSA was added to a 3000 ml, four neck round bottom flask equipped with a Dean Stark trap, a mechanical stirrer and a dripping addition funnel. 1,12-diaminododecane was then added drop-wise at 100° C. all at once. The temperature of the reaction was raised to 165° C. after addition of the amine under a nitrogen atmosphere. The reactions carried out to make hybrid PIBSA copolymer 1000 with DADD are shown in Table 3 along with analysis results of each of the products.

TABLE 3

Hybrid PIBSA copolymer made from polyPIBSA 1000 and 1,12-diaminododecane (DADD)

| Example | Amine/anhydride CMR | polyPIBSA 1000 (g) | % unreacted anhydride | Amine DADD (g) | % N | Vis @ 100 C., cSt | SAP No. mgKOH/g |
|---|---|---|---|---|---|---|---|
| 9 | 0.125 | 300 | 25 | 5.66 | 0.30 | 210 | 44.2 |
| 10 | 0.19 | 300 | 38 | 8.61 | 0.40 | 272 | 33.0 |
| 11 | 0.25 | 700 | 50 | 11.32 | 0.54 | 384 | 24.0 |

Examples 12-14

Preparation of Hybrid PIBSA Copolymer from Ethylene Diamine and PolyPIBSA 2300

PolyPIBSA 2300 (SAP number=41.9 mgKOH/g, 47.9% actives in diluent oil), as prepared in example 2, was used for these examples. PolyPIBSA was added to a 3000 ml, four neck round bottom flask equipped with a Dean Stark trap, a mechanical stirrer and a dripping addition funnel. Ethylene diamine was then added drop-wise at 90-100° C. The temperature of the reaction was raised to 165° C. after addition of the amine under a nitrogen atmosphere. The reactions carried out to make hybrid PIBSA copolymer 2300 with ethylene diamine are shown in Table 4, along with analysis results of each of the products.

TABLE 4

Hybrid PIBSA copolymer made from polyPIBSA 2300 and ethylene diamine

| Example | Amine/anhydride CMR | polyPIBSA 2300 (g) | % unreacted anhydride | Amine EDA (g) | % N | Vis @ 100 C., cSt | SAP No. mgKOH/g |
|---|---|---|---|---|---|---|---|
| 12 | 0.125 | 1000 | 25 | 2.83 | 0.22 | 283 | 18.3 |
| 13 | 0.19 | 1000 | 38 | 4.30 | 0.25 | 304 | 9.3 |
| 14 | 0.25 | 1000 | 50 | 5.66 | 0.31 | 334 | 8.8 |

Examples 15-17

Preparation of Hybrid PIBSA Copolymer from 1,6-diaminohexane and polyPIBSA 2300

PolyPIBSA 2300 (SAP number=41.9 mgKOH/g, 47.9% actives in diluent oil), as prepared in example 2, was used for these examples. PolyPIBSA was added to a 3000 ml, four neck round bottom flask equipped with a Dean Stark trap, a mechanical stirrer and a dripping addition funnel, 1,6-diaminohexane was then added drop-wise at 35° C. The temperature of the reaction was raised to 165° C. after addition of the amine under a nitrogen atmosphere. The samples were taken immediately after addition of the amine and every hour afterwards to study the progress of the reaction. The reactions carried out to make hybrid PIBSA copolymer 2300 with DAH are shown in Table 5, along with analysis results of each of the products.

TABLE 5

Hybrid PIBSA copolymer made from polyPIBSA 2300 and 1,6-diaminohexane (DAH)

| Example | Amine/anhydride CMR | polyPIBSA 2300 (g) | % unreacted anhydride | Amine DAH (g) | % N | Vis @ 100 C., cSt | SAP No. mgKOH/g |
|---|---|---|---|---|---|---|---|
| 15 | 0.125 | 1000 | 25 | 5.47 | 0.18 | 284 | 11.0 |
| 16 | 0.206 | 1000 | 41 | 9.00 | 0.26 | 315 | 7.7 |
| 17 | 0.25 | 1000 | 50 | 10.95 | 0.28 | 338 | 7.4 |

Examples 18-20

Preparation of Hybrid PIBSA Copolymer from 1,12-diaminododecane and PolyPIBSA 2300

PolyPIBSA 2300 (SAP number=41.9 mgKOH/g, 47.9% actives in diluent oil), as prepared in example 2, was used for these examples. PolyPIBSA was added to a 3000 ml, four neck round bottom flask equipped with a Dean Stark trap, a mechanical stirrer and a dripping addition funnel. 1,12-diaminododecane was then added drop-wise at 100° C. all at once. The temperature of the reaction was raised to 165° C. after addition of the amine under a nitrogen atmosphere. The reactions carried out to make hybrid PIBSA copolymer 2300 with DADD are shown in Table 6, along with analysis results of each of the products.

TABLE 6

Hybrid PIBSA copolymer made from polyPIBSA 2300 and 1,12-diaminododecane

| Example | Amine/anhydride CMR | polyPIBSA 2300 (g) | % unreacted anhydride | Amine DADD (g) | % N | Vis @ 100 C., cSt | SAP No. mgKOH/g |
|---|---|---|---|---|---|---|---|
| 18 | 0.125 | 300 | 25 | 2.83 | 0.15 | 290 | 21.0 |
| 19 | 0.19 | 300 | 38 | 4.30 | 0.22 | 330 | 13.1 |
| 20 | 0.25 | 300 | 50 | 5.66 | 0.28 | 389 | 9.9 |

Examples 21-35

Preparation of Polymeric Dispersants from Hybrid PIBSA Copolymer and Heavy Polyamine (HPA)

Hybrid PIBSA copolymer, as prepared in examples 3-11 from PolyPIBSA1000, was added to a 1000 mL four neck round bottom flask equipped with a Dean Stark trap, a mechanical stirrer, and an addition funnel. HPA was then added under nitrogen at 120-130° C. drop-wise to the reaction flask. The temperature of the reaction was raised to 165° C. after addition of the amine. The reactions carried out to make polymeric dispersants from hybrid PIBSA copolymer 1000 with HPA are shown in Table 7, along with analysis results of each of the products,

TABLE 7

Polymeric dispersants from hybrid PIBSA copolymer 1000 and HPA

| Example | Hybrid succinic anhydride copolymer Example | (g) | Amine/residual anhydride CMR | HPA, (g) | TBN, mgKOH/g | % N | Viscosity @100° C., cSt |
|---|---|---|---|---|---|---|---|
| 21 | 6 | 300 | 0.5 | 23.1 | 61.9 | 2.75 | 10799 |
| 22 | 7 | 300 | 0.5 | 19.1 | 49.4 | 2.50 | 5568 |
| 23 | 8 | 300 | 0.5 | 15.4 | 40.4 | 2.16 | 2183 |
| 24 | 3 | 300 | 0.5 | 23.1 | 57.4 | 2.75 | TV |
| 25 | 4 | 300 | 0.5 | 19.39 | 54.3 | 2.51 | 8758 |
| 26 | 5 | 300 | 0.5 | 15.4 | 39.4 | 2.21 | 1783 |

TABLE 7-continued

Polymeric dispersants from hybrid PIBSA copolymer 1000 and HPA

| Example | Hybrid succinic anhydride copolymer Example | (g) | Amine/residual anhydride CMR | HPA, (g) | TBN, mgKOH/g | % N | Viscosity @100° C., cSt |
|---|---|---|---|---|---|---|---|
| 27 | 3 | 300 | 0.9 | 41.58 | 123.3 | 4.34 | 4740 |
| 28 | 4 | 300 | 0.9 | 34.3 | 104.0 | 3.79 | 1227 |
| 29 | 5 | 300 | 0.9 | 28.29 | 97.4 | 3.33 | 1319 |
| 30 | 6 | 300 | 0.9 | 41.5 | 127.0 | 4.66 | TV |
| 31 | 7 | 300 | 0.9 | 34.3 | 101.0 | 3.82 | TV |
| 32 | 8 | 300 | 0.9 | 27.7 | 80.9 | 3.32 | 1691 |
| 33 | 9 | 100 | 0.5 | 7.7 | 41.3 | 2.63 | Gel |
| 34 | 10 | 100 | 0.5 | 6.4 | 35.9 | 2.52 | Gel |
| 35 | 11 | 100 | 0.5 | 5.1 | 30.6 | 2.63 | Gel |

TV = too viscous to measure

Examples 36-42

Preparation of Polymeric Dispersants from Hybrid PIBSA Copolymer made from PP1000 and DETA, TETA, and TEPA Hybrid PIBSA copolymer prepared in examples 9-11 was added to a 1000 mL four neck round bottom flask equipped with a Deak Stark trap, a mechanical stirrer, nitrogen flow and an addition funnel. To the hybrid PIBSA copolymer a polyamine was added at 160-165° C. drop-wise to the reaction flask. The temperature of the reaction was kept at 165° C. after addition of the amine. The reactions carried out to make polymeric dispersants from hybrid PIBSA copolymer made from PolyPIBSA 1000 and DADD are shown in Table 8 along with analysis results of each of the products.

TABLE 8

Polymeric dispersants from hybrid PIBSA copolymer made from PolyPIBSA1000 and DETA, TETA, and TEPA

| Example | Hybrid succinic anhydride copolymer Example | (g) | Amine/residual anhydride CMR | Amine type | Amine (g) | TBN, mgKOH/g | % N | Viscosity @100° C., cSt |
|---|---|---|---|---|---|---|---|---|
| 36 | 9 | 50 | 0.4 | DETA | 1.15 | 14.5 | 1.30 | 2902 |
| 37 | 9 | 50 | 0.5 | TETA | 2.04 | 30.4 | 1.78 | 1871 |
| 38 | 9 | 50 | 0.5 | TEPA | 2.64 | 46.1 | 2.18 | 5737 |
| 39 | 10 | 50 | 0.21 | DETA | 0.71 | 11.3 | 1.11 | 3023 |
| 40 | 10 | 50 | 0.4 | TETA | 0.84 | 9.6 | 1.16 | 1698 |
| 41 | 10 | 40 | 0.2 | TEPA | 0.14 | 15.7 | 1.22 | 1183 |
| 42 | 6 | 38 | 0.1 | TEPA | 0.62 | 9.7 | 0.95 | 1235 |

Examples 43-57

Preparation of Polymeric Dispersants from Hybrid PIBSA Copolymer made from PolyPIBSA 2300

Hybrid PIBSAHybrid succinic anhydride copolymer, as prepared in examples 12-20 from PolyPIBSA 2300, was added to a 1000 mL four neck round bottom flask equipped with a Dean Stark trap, a mechanical stirrer, and an addition funnel. HPA was then added under nitrogen at 120-130° C. drop-wise to the reaction flask. The temperature of the reaction was raised to 165° C. after addition of the amine. The reactions carried out to make polymeric dispersants from hybrid PIBSAhybrid succinic anhydride copolymer 2300 with HPA are shown in Table 9, along with analysis results of each of the products.

TABLE 9

Polymeric dispersants from hybrid PIBSA copolymer 2300 and HPA

| Example | Hybrid succinic anhydride copolymer Example | (g) | Amine/residual anhydride CMR | HPA, (g) | TBN, mgKOH/g | % N | Viscosity @100° C., cSt |
|---|---|---|---|---|---|---|---|
| 43 | 15 | 300 | 0.5 | 11.5 | 33.8 | 1.40 | 669 |
| 44 | 16 | 300 | 0.5 | 9.1 | 30.0 | 1.26 | 642 |
| 45 | 17 | 300 | 0.5 | 7.7 | 24.3 | 1.13 | 578 |
| 46 | 12 | 300 | 0.5 | 11.5 | 25.6 | 1.38 | 634 |
| 47 | 13 | 300 | 0.5 | 9.5 | 24.0 | 1.21 | 659 |
| 48 | 14 | 300 | 0.5 | 7.7 | 19.9 | 1.14 | 598 |
| 49 | 15 | 300 | 0.9 | 20.8 | 54.0 | 2.34 | 587 |
| 50 | 16 | 300 | 0.9 | 16.2 | 49.9 | 1.91 | 506 |
| 51 | 17 | 300 | 0.9 | 13.9 | 37.0 | 1.74 | 538 |
| 52 | 12 | 300 | 0.9 | 20.8 | 52.0 | 2.27 | 579 |
| 53 | 13 | 300 | 0.9 | 17.2 | 44.5 | 2.01 | 509 |
| 54 | 14 | 300 | 0.9 | 13.8 | 39.0 | 1.72 | 549 |
| 55 | 18 | 100 | 0.5 | 7.7 | 29.6 | 1.34 | 726 |
| 56 | 20 | 100 | 0.5 | 5.1 | 21.4 | 1.15 | 646 |
| 57 | 19 | 100 | 0.5 | 6.4 | 27.7 | 1.31 | 669 |

Example 58-63

Ethylene Carbonate Post Treated Succinimides

To a 250 mL four neck flask equipped with a magnetic stirrer and Dean Stark trap was added 100 g of the succinimide made in Example 43. The temperature was heated to 160° C. under nitrogen, with stirring and to this was added molten ethylene carbonate (10.86 g, 123 mmol) dropwise over a two hour period. Then the temperature was increased to 165° C. and held for two hours. The chemical and physical properties of this product are shown in Table 10. Examples of other EC post treated succinimides prepared in the same way are also reported in Table 10.

TABLE 10

Ethylene carbonate (EC) post treated dispersants from HPA succinimides made from 2300 MW hybrid PIBSA.

| Example | HPA succinimide Example | EC, (g) | TBN, (g) | mgKOH/g | % N | Viscosity @100° C., cSt |
|---|---|---|---|---|---|---|
| 58 | 43 | 100 | 10.86 | 17.0 | 1.36 | TV |
| 59 | 44 | 100 | 8.59 | 14.3 | 1.19 | 1064 |
| 60 | 45 | 100 | 7.32 | 14.0 | 1.11 | 870 |
| 61 | 46 | 100 | 10.86 | 16.5 | 1.37 | 1344 |
| 62 | 47 | 100 | 9.03 | 14.0 | 1.21 | 1065 |
| 63 | 48 | 100 | 7.32 | 14.0 | 1.14 | 817 |

TV = too viscous to measure

Examples 64-69

Phthalic Anhydride Post Treatment Succinimides

To a 250 mL four neck flask equipped with a magnetic stirrer and Dean Stark trap was added 100 g of the succinimide made in Example 49. The temperature was heated to 160° C. under nitrogen, with stirring and to this was added phthalic anhydride powder (3.56 g, 24 mmol) in portions over 1.5 hours. Then the temperature was increased to 165° C. and held for one hour. The chemical and physical properties of this product are shown in Table 11. Examples of other phthalic anhydride post treated succinimides prepared in the same way are also reported in Table 11.

TABLE 11

Phthalic Anhydride (PA) post treated dispersants from HPA succinimides made from 2300 MW hybrid PIBSA.

| Example | HPA succinimide Example | PA, (g) | TBN, (g) | mgKOH/g | % N | Viscosity @100° C., cSt |
|---|---|---|---|---|---|---|
| 64 | 49 | 100 | 3.56 | 44.7 | 2.21 | 693 |
| 65 | 50 | 100 | 2.83 | 32.2 | 1.84 | 725 |
| 66 | 51 | 100 | 2.42 | 30.2 | 1.69 | 722 |
| 67 | 52 | 100 | 3.56 | 38.6 | 2.16 | 769 |
| 68 | 53 | 100 | 2.97 | 36.3 | 1.94 | 715 |
| 69 | 54 | 100 | 2.42 | 27.7 | 1.62 | 636 |

Soot Thickening Bench Test Results

The post-treated polysuccinimides from the preceding examples were tested in soot thickening bench tests 2007A and 2007B, which measure the ability of a formulation to disperse soot and control viscosity increase resulting from the addition of a soot surrogate.

In the 2007A soot thickening test, 98.0 g of the test sample was placed into a 250 mL beaker. The test sample contained 6 wt % of the test dispersant, 68 millimoles OL219, 22 millimoles OL262, 11 millimoles OL249S, 4 millimoles 246S, 0.4 wt % OL2509M, 0.3 wt % OL 2509Z, 0.2 wt % OL17502, 5 ppm foam inhibitor, 8.5 wt % PT 8011 VII, and Exxon 150N/600N base oil (64/36). To this was added 2.0 g Vulcan XC-72® carbon black soot. The mixture was stirred and then stored for 16 hours in a dessicator. A second sample without the soot was mixed for 60 seconds using a Willems Polytron Homogenizer-Model PF 45/6 and then degassed in a vacuum oven for 30 minutes at 50-55 C. The viscosity of the two samples was then measured at 1000 using a capillary viscometer. The percent viscosity increase was calculated by comparing the viscosity of the samples with and without carbon black. The lower percent viscosity increase the better the dispersancy of the dispersant.

In the 2007B soot thickening test 45.0 g of the test sample was placed into a 150 mL plastic beaker. The test sample contained 3 wt % of the test dispersant, 2 wt % OL12002, 2 wt % OL13000, 4 millimoles OL246S, 52 millimoles OL 219, 19 millimoles OL262, 0.5 wt % OL2505R, 0.5 wt % OL2509M, 0.2 wt % OL17501, 0.2 wt % OL17505, 5 ppm foam inhibitor, 7.6 wt % of PT8011 VII and Chevron 220N/600N base oil (83/17). To this was added 5.0 grams of Raven 1040 carbon black powder. The mixture was stirred until all the carbon black is wetted. Then the mixture was homogenized using the Ultra Turrax T25 Tissumizer at the highest speed. The sooted sample was degassed in a vacuum oven for 15 minutes. After 15 minutes under vacuum, the pressure was equalized in the oven and the sample was removed. The viscosity was measured at 100 C. The percent viscosity increase was calculated by comparing the viscosity of the samples with and without soot. The 2007B test results have shown to perform inversely with the T-11 engine test. Therefore the higher percent viscosity increase the better the dispersancy of the dispersant.

The results of the bench tests for these dispersants were compared against the soot thickening bench test results of the baselines without any dispersant.

TABLE 13

Soot thickening bench test results from EC post treated and PA post treat succinimides

| Example | 2007A % viscosity increase | 2007B % viscosity Increase |
|---|---|---|
| baseline | 280 | 40 |
| 58 | 85 | 42 |
| 59 | 112 | 42 |
| 60 | 134 | 40 |
| 61 | 93 | 43 |
| 62 | 125 | 42 |
| 63 | 148 | 41 |
| 64 | 47 | 48 |
| 65 | 37 | 43 |
| 66 | 54 | 42 |
| 67 | 74 | 40 |
| 68 | 39 | 43 |
| 69 | 71 | 43 |

The soot thickening results show that ethylene carbonate and phthalic anhydride post treated succinimides of the present invention gave improved dispersancy compared to the baseline formulation without any dispersant.

Shear Stability Test Results

Example B (Comparative)

Preparation of a High Molecular Weight Succinimide from a Copolymer, a High Molecular Weight Linking Amine and an Amine in a One Step Process OLOA 13300 is a non-conventional A polysuccinimides-uccinimide dispersant derived from Terpolymer PIBSA, N-phenylenediamine and a polyether amine known as Huntsman Jeffamine® XTJ-501 (also called ED-900). OLOA 13300 The dispersant is made by the synthesis reaction of terpolymer PIBSA with the two amines simultaneously with the total amine charge mole ratio of 1.0 and the NPPDA/XTJ-501 charge mole ratio of 1.0. The synthesis of OLOA 13300 the dispersant was done as described in U.S. Patent Application Publication No. US20060247386, Example 3, (for the preparation of a succinimide from a terpolymer based copolymer reacted with N-phenylphenylenediamine and polypropyleneoxide diamine).

The Shear Stability Index was measured using ASTM 6278 test method which was run at 15-17 psi for 30 cycles in a 15W40 viscosity grade oil. The ethylene carbonate post treated polysuccinimidesuccinimide made from HPA reacted with hybrid PIBSApolyPIBSA 2300 containing 0.25 CMR EDA/anhydride as the linking amine (prepared in Example 63) was found to be 6.07. This indicates that the polysuccinimidesuccinimide of Example 63 is very shear stable. For comparison the shear stability index of the polysuccinimidesuccinimide prepared in Example B (Comparative) was 42, which indicates that this product was not very shear stable.

Shear stability test results show that the EC post treated dispersant made from hybrid PIBSAhybrid succinic anhydride copolymer is more shear stable than OLOA 13300 the dispersant made in Example B (Comparative).

It is understood that although modifications and variations of the invention can be made without departing from the spirit and scope thereof, only such limitations should be imposed as are indicated in the appended claims

What is claimed is:

1. A hybrid succinic anhydride copolymer having the following formula:

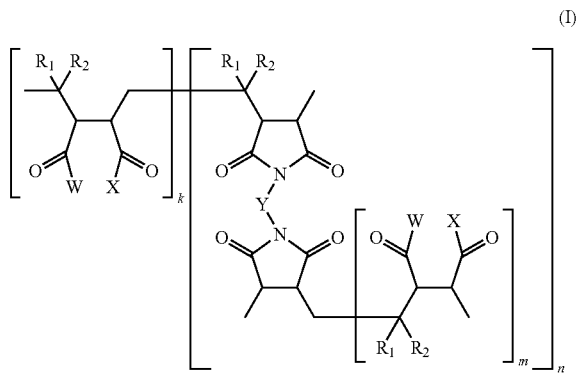

(I)

wherein one of $R_1$ and $R_2$ is either lower alkyl or hydrogen, and the other of $R_1$ and $R_2$ is polyalkyl, W and X are independently selected from the group consisting of —OH, —O—R' wherein R' is lower alkyl, or taken together are —O— to form a succinic anhydride group, n, m, and k are 1 to 20, and Y is alkylene having from about 2 to 20 carbon atoms.

2. A hybrid succinic anhydride copolymer prepared by the process which comprises reacting a copolymer of an (i) an unsaturated acidic reagent; and (ii) a mono-olefin, with at least one linking hydrocarbyl di-primary amine, thereby producing a hybrid succinic anhydride copolymer having from about 50% to about 90% unreacted anhydride groups.

3. The hybrid succinic anhydride copolymer of claim 2 wherein the unsaturated acidic reagent is maleic anhydride.

4. The hybrid succinic anhydride copolymer of claim 2 wherein the mono-olefin is at least one normal alpha olefin, 1-olefin, polyolefin, or mixtures thereof.

5. The hybrid succinic anhydride copolymer of claim 2 wherein the mono-olefin is polybutene.

6. The hybrid succinic anhydride copolymer of claim 5 wherein the mono-olefin is polyisobutene having at least about 20% of a methylvinylidene isomer.

7. The hybrid succinic anhydride copolymer of claim 2 wherein the hybrid succinic anhydride copolymer contains from about 50% to about 80% unreacted anhydride groups.

8. The hybrid succinic anhydride copolymer of claim 2 wherein the at least one linking hydrocarbyl di-primary amine is selected from the group consisting of ethylene diamine; 1,6-diaminohexane; and 1,12-diaminododecane.

9. The hybrid succinic anhydride copolymer claim 2 wherein the charge mole ratio of the hydrocarbyl di-primary amine to anhydride is from about 0.05:1 to about 0.45:1.

* * * * *